United States Patent

Shiota

(10) Patent No.: US 10,640,319 B2
(45) Date of Patent: May 5, 2020

(54) IMAGE READING APPARATUS, BINDING MEMBER DETECTING APPARATUS, AND IMAGE READING SYSTEM

(71) Applicant: SEIKO EPSON CORPORATION, Tokyo (JP)

(72) Inventor: Takayuki Shiota, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/020,533

(22) Filed: Jun. 27, 2018

(65) Prior Publication Data

US 2019/0002230 A1 Jan. 3, 2019

(30) Foreign Application Priority Data

Jun. 29, 2017 (JP) .................. 2017-127568
Feb. 22, 2018 (JP) .................. 2018-029881

(51) Int. Cl.
| | |
|---|---|
| B65H 31/36 | (2006.01) |
| H04N 1/00 | (2006.01) |
| H04N 1/32 | (2006.01) |
| B65H 31/30 | (2006.01) |
| G03G 15/00 | (2006.01) |

(52) U.S. Cl.
CPC ......... *B65H 31/36* (2013.01); *B65H 31/3027* (2013.01); *G03G 15/6541* (2013.01); *H04N 1/00663* (2013.01); *H04N 1/3263* (2013.01); *H04N 1/32657* (2013.01); *B65H 2801/06* (2013.01)

(58) Field of Classification Search
CPC ............... B65H 31/36; B65H 31/3027; B65H 2801/26; G03G 15/6541; H04N 1/00663; H04N 1/3263; H04N 1/32657

USPC ....................................... 270/58.08
See application file for complete search history.

(56) References Cited

U.S. PATENT DOCUMENTS

| | | | |
|---|---|---|---|
| 4,518,919 A * | 5/1985 | Ishida ............... | H03K 17/9517 |
| | | | 194/213 |
| 5,087,027 A | 2/1992 | Acquaviva | |
| 5,646,794 A | 7/1997 | Lindsay et al. | |

(Continued)

FOREIGN PATENT DOCUMENTS

| | | |
|---|---|---|
| CN | 1494707 | 5/2004 |
| JP | 09-077282 A | 3/1997 |

(Continued)

OTHER PUBLICATIONS

European Search Report for Application No. 18180193 dated Nov. 5, 2018.

*Primary Examiner* — Leslie A Nicholson, III
(74) *Attorney, Agent, or Firm* — Workman Nydegger

(57) ABSTRACT

There is provided an image reading apparatus including: a reading unit that reads a document; a document setting unit that sets the document to be fed toward the reading unit; and a binding member detector that detects a binding member binding the document and is provided in an outside of the document setting unit. The binding member detector is provided on a side surface of a housing constituting an outside of the image reading apparatus. The binding member detector includes a first portion and a second portion disposed to face the first portion and is configured to detect the binding member by passing the document through between the first portion and the second portion.

15 Claims, 19 Drawing Sheets

(56) References Cited

U.S. PATENT DOCUMENTS

| | | |
|---|---|---|
| 6,764,068 B1 | 7/2004 | Anderson et al. |
| 7,556,265 B1 | 7/2009 | Bakker et al. |
| 8,651,473 B2 * | 2/2014 | Suzuki .................... B65H 3/06 254/28 |
| 9,938,100 B2 * | 4/2018 | Link .................. H04N 1/00771 |
| 2004/0129771 A1 | 7/2004 | Landwehr et al. |
| 2016/0185544 A1 | 6/2016 | Link et al. |
| 2016/0304305 A1 | 10/2016 | Link et al. |
| 2017/0126914 A1 | 5/2017 | Koyanagi |
| 2019/0007563 A1 | 1/2019 | Shiota |

FOREIGN PATENT DOCUMENTS

| | | |
|---|---|---|
| JP | 2002221880 A | 8/2002 |
| JP | 2006189376 A | 7/2006 |
| JP | 2006-311052 A | 11/2006 |
| JP | 2012012169 A | 1/2012 |
| JP | 2019-012895 | 1/2019 |
| TW | 201715875 A | 5/2017 |

\* cited by examiner

FIG. 10
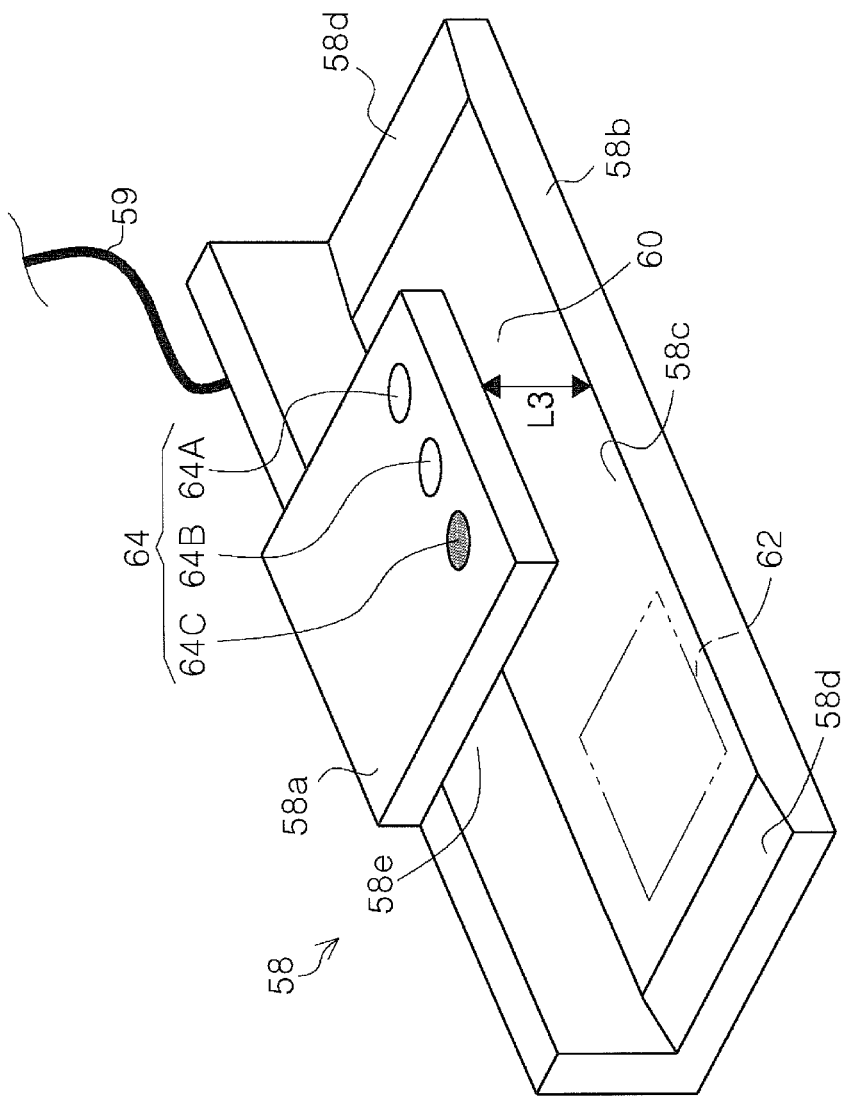
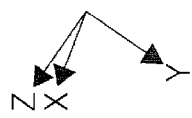

FIG. 13
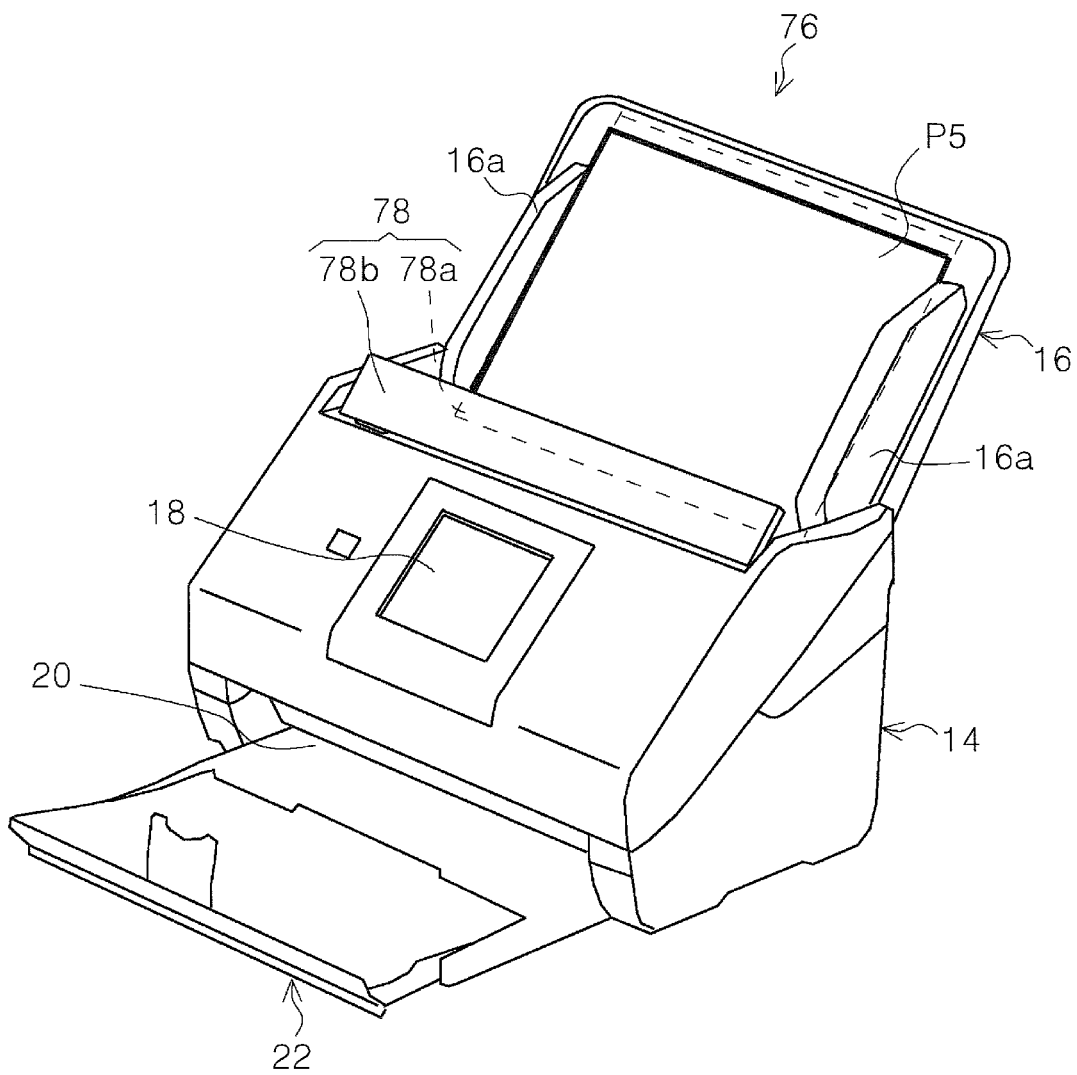
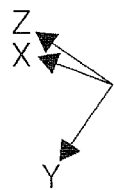

FIG. 15
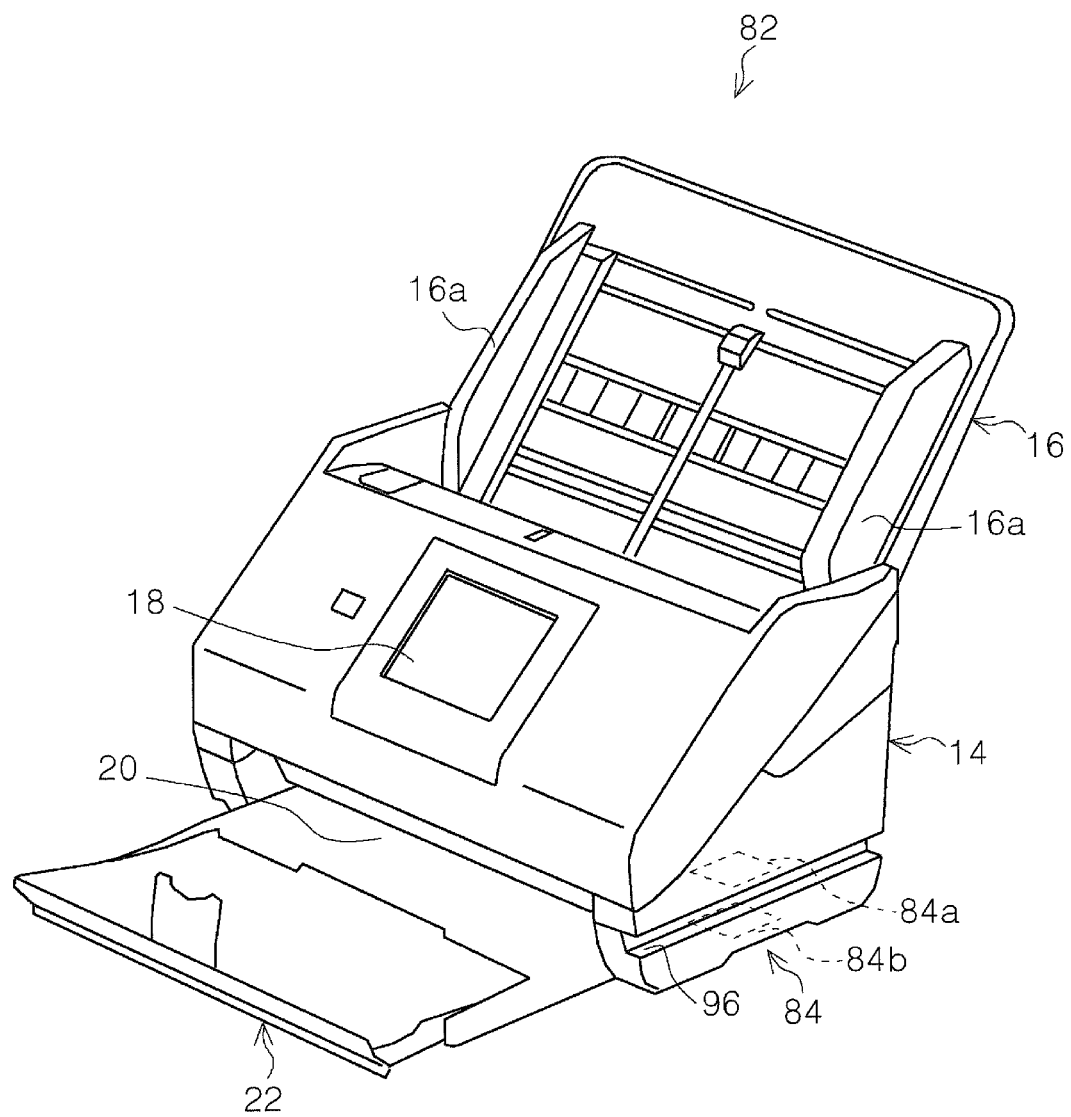
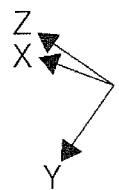

IMAGE READING APPARATUS, BINDING MEMBER DETECTING APPARATUS, AND IMAGE READING SYSTEM

BACKGROUND

1. Technical Field

The present invention relates to an image reading apparatus which reads a document. The invention further relates to a binding member detecting apparatus which detects a binding member binding the document and an image reading system which includes the binding member detecting apparatus.

2. Related Art

In an image reading apparatus represented by a scanner, in some case, a user mistakenly sets a document bundle stapled as it is and a feeding job is started. In this case, it is concerned that there is a problem that stapled portions of transported documents are torn.

In view of the problem, JP-A-9-077282 discloses a document feeding apparatus including a non-contact metal detector for detecting a binding needle in an upstream portion in a document transport direction rather than a transport roller for separating the documents one by one and transporting the documents.

In the document feeding apparatus in JP-A-9-077282, more specifically, the metal detector is provided in each of a cover to which the transport roller is attached and a cursor for aligning the document in a width direction orthogonal to a moving direction of the document. When the metal detector detects the binding needle after rotation of the transport roller, that is, a document feeding operation is started, the document feeding apparatus stops to drive the transport roller or the like.

However, when a feeding operation is performed on the bound document, in many cases, immediately after the feeding operation is started, the document is torn. That is, an operation of detecting the binding needle after starting the feeding operation, and then stopping the feeding operation is not sufficient to securely protect the document.

SUMMARY

An advantage of some aspects of the invention is to reliably prevent a document from being damaged when a feeding operation is performed on a document bundle bound by a binding member.

According to an aspect of the invention, there is provided an image reading apparatus including: a reading unit that reads a document; a document setting unit that sets the document to be fed toward the reading unit; and a binding member detector that detects a binding member binding the document and is provided in an outside of the document setting unit.

In this case, the image reading apparatus includes the reading unit that reads the document, the document setting unit that sets the document to be fed toward the reading unit, and the binding member detector that detects the binding member binding the document and is provided in an outside of the document setting unit. That is, since the binding member detector is provided at a position at which the document is detected before the document is set to the document setting unit and the binding member is detected before the document feeding operation from the document setting unit is started, it is possible to more reliably prevent the document from being damaged.

In the image reading apparatus, it is preferable that the binding member detector be provided on a side surface of a housing constituting an outside of the image reading apparatus.

In this case, since the binding member detector is provided on the side surface of the housing constituting the outside of the image reading apparatus, it is possible to more reliably prevent the document from being damaged.

In the image reading apparatus, it is preferable that the image reading apparatus further include: a document receiving unit that receives the document read and discharged, and in which the binding member detector is provided on a lower side of the document receiving unit.

In this case, since the binding member detector is provided on the lower side of the document receiving unit, it is possible to more reliably prevent the document from being damaged.

In the image reading apparatus, it is preferable that the binding member detector include a first portion and a second portion disposed to face the first portion and detect the binding member by passing the document through between the first portion and the second portion.

In this case, since the binding member detector includes the first portion and the second portion disposed to face the first portion and is configured to detect the binding member by passing the document through between the first portion and the second portion, it is possible to prevent the document from largely deviating from a detectable region of the binding member and to more reliably detect the binding member.

In the image reading apparatus, it is preferable that an interval between the first portion and the second portion correspond to a maximum loading height of the document settable to the document setting unit.

In this case, since the interval between the first portion and the second portion corresponds to the maximum loading height of the document settable to the document setting unit, it is possible to perform both of the detecting operation of the binding member by using the binding member detector and the operation of determining whether or not the document can be loaded in the document setting unit and to improve availability of a user.

In the image reading apparatus, it is preferable that an interval between the first portion and the second portion be configured to be adjustable.

In this case, since the binding member detector includes the adjustable interval between the first portion and the second portion, by adjusting the interval, it is possible to adjust an output (for example, magnetic field formed by oscillation coil) so as to detect the binding member. As a result, for example, by decrease the interval, it is possible to weaken the magnetic field and to suppress that the magnetic field has a bad influence on the image reading apparatus or the peripheral of the image reading apparatus.

According to another aspect of the invention, there is provided an image reading apparatus including: a reading unit that reads a document; a document setting unit that sets the document to be fed toward the reading unit; and a binding member detector that detects a binding member binding the document, in which the binding member detector is provided to be movable along a document feeding direction from and to the document setting unit.

In this case, the image reading apparatus includes the reading unit that reads the document, the document setting unit that sets the document to be fed toward the reading unit, and the binding member detector that detects the binding member binding the document. Since the binding member detector is provided to be movable along the document feeding direction from and to the document setting unit, it is possible to detect the binding member before the feeding operation is started by moving the binding member detector along the document feeding direction. As a result, it is possible to more reliably prevent the document from being damaged.

In the image reading apparatus, it is preferable that the image reading apparatus further include: a notification unit that performs notification of detection of the binding member by the binding member detector.

In this case, since the image reading apparatus includes the notification unit that performs notification of the detection of the binding member by the binding member detector, it is possible to promptly and reliably notify the user of the presence of the binding member and to improve the availability of the user.

In the image reading apparatus, it is preferable that the image reading apparatus further include: a feeding unit that transports the document from the document setting unit; and a document detector that detects passage of the document when the document passes through the binding member detector, in which a controller that controls the feeding unit causes the feeding unit to perform a document feeding operation after the document detector detects the passage of the document.

In this case, since the controller that controls the feeding unit causes the feeding unit to perform the document feeding operation after the document detector detects the passage of the document, the detecting operation using the binding member detector is obligatorily performed before the document is fed by the feeding unit and it is possible to more reliably prevent the document P being damaged.

In addition, "document passes through binding member detector" does not mean only a form in which the document passes through the binding member detector fixedly provided, but also a form in which the document passes through the binding member detector by moving the binding member detector from and to the document.

In the image reading apparatus, it is preferable that the binding member detector detect a change in a magnetic field to detect the binding member, the apparatus further includes: a document detector that detects passage of the document through the binding member detector; and a controller that receives information on the document detected by the document detector and information on the change in the magnetic field detected by the binding member detector, and in which in a case where the binding member detector detects the change in the magnetic field in a document undetected state in which the document detector does not detect the passage of the document, the controller executes a predetermined process.

In this case, in the document undetected state in which the document detector does not detect the passage of the document, in a case where the binding member detector detects the change in the magnetic field, that is, a case where the disturbance noise is detected, the controller 40 performs the predetermined process, so that it is possible to more accurately detect the binding member.

"Predetermined process" is not limited to control of components of the image reading apparatus by the controller, but also includes a process such as calculation inside the controller, that is, an invisible process other than a process of which a processing result is visible from an outside.

In the image reading apparatus, it is preferable that the binding member detector be detachably provided with respect to a main body of the image reading apparatus.

In this case, since the main body of the image reading apparatus is provided with the detachable binding member detector, by removing out the binding member detector from the main body, depending on a form of the document, the operation of detecting the binding member by the binding member detector becomes easier.

According to still another aspect of the invention, there is provided a binding member detecting apparatus that detects a binding member binding a document, the apparatus including: a first portion and a second portion disposed to face the first portion, and in which the binding member is detected by passing the document through between the first portion and the second portion.

In this case, since the binding member detecting apparatus includes the first portion and the second portion disposed to face the first portion and is configured to detect the binding member by passing the document through between the first portion and the second portion, it is possible to prevent the document from largely deviating from a detectable region of the binding member and to more reliably detect the binding member.

In the image reading apparatus, it is preferable that the first portion and the second portion be provided with an interval in a horizontal direction and a contact portion that comes into contact with an end of the document be provided on a lower side between the first portion and the second portion.

In this case, since the first portion and the second portion are provided with the interval in the horizontal direction and the contact portion that comes into contact with an end of the document is provided on the lower side between the first portion and the second portion, it is possible to simultaneously align the end of the document and detect the binding member and it is possible to improve the availability of the user.

According to still another aspect of the invention, there is provided an image reading system including: an image reading apparatus that includes a reading unit which reads a document and a document setting unit which sets the document to be fed toward the reading unit; and the binding member detecting apparatus according to the aspect.

In this case, it is possible to prevent the document from largely deviating from a detectable region of the binding member and to more reliably detect the binding member and it is possible to simultaneously align the end of the document and detect the binding member and it is possible to improve the availability of the user.

In the image reading system, it is preferable that the binding member detecting apparatus obtain a power from the image reading apparatus.

In this case, since the binding member detecting apparatus obtains the power from the image reading apparatus, it is unnecessary to prepare the power supply dedicated to the binding member detecting apparatus and it is possible to improve the availability of the user.

In the image reading system, it is preferable that an interval between the first portion and the second portion correspond to a maximum loading height of the document settable to the document setting unit.

In this case, since the interval between the first portion and the second portion corresponds to the maximum loading height of the document settable to the document setting unit, it is possible to perform both of the detecting operation of the binding member by using the binding member detecting apparatus and the operation of determining whether or not the document can be loaded in the document setting unit and to improve the availability of the user.

BRIEF DESCRIPTION OF THE DRAWINGS

The invention will be described with reference to the accompanying drawings, wherein like numbers reference like elements.

FIG. 10 is an external perspective view of a binding member detecting apparatus according to the second embodiment.

FIG. 13 is a perspective view illustrating a state in which a document is set to the scanner according to the third embodiment.

FIG. 15 is a diagram illustrating a modification example of the binding member detector according to the first embodiment.

DESCRIPTION OF EXEMPLARY EMBODIMENTS

Figure 1:
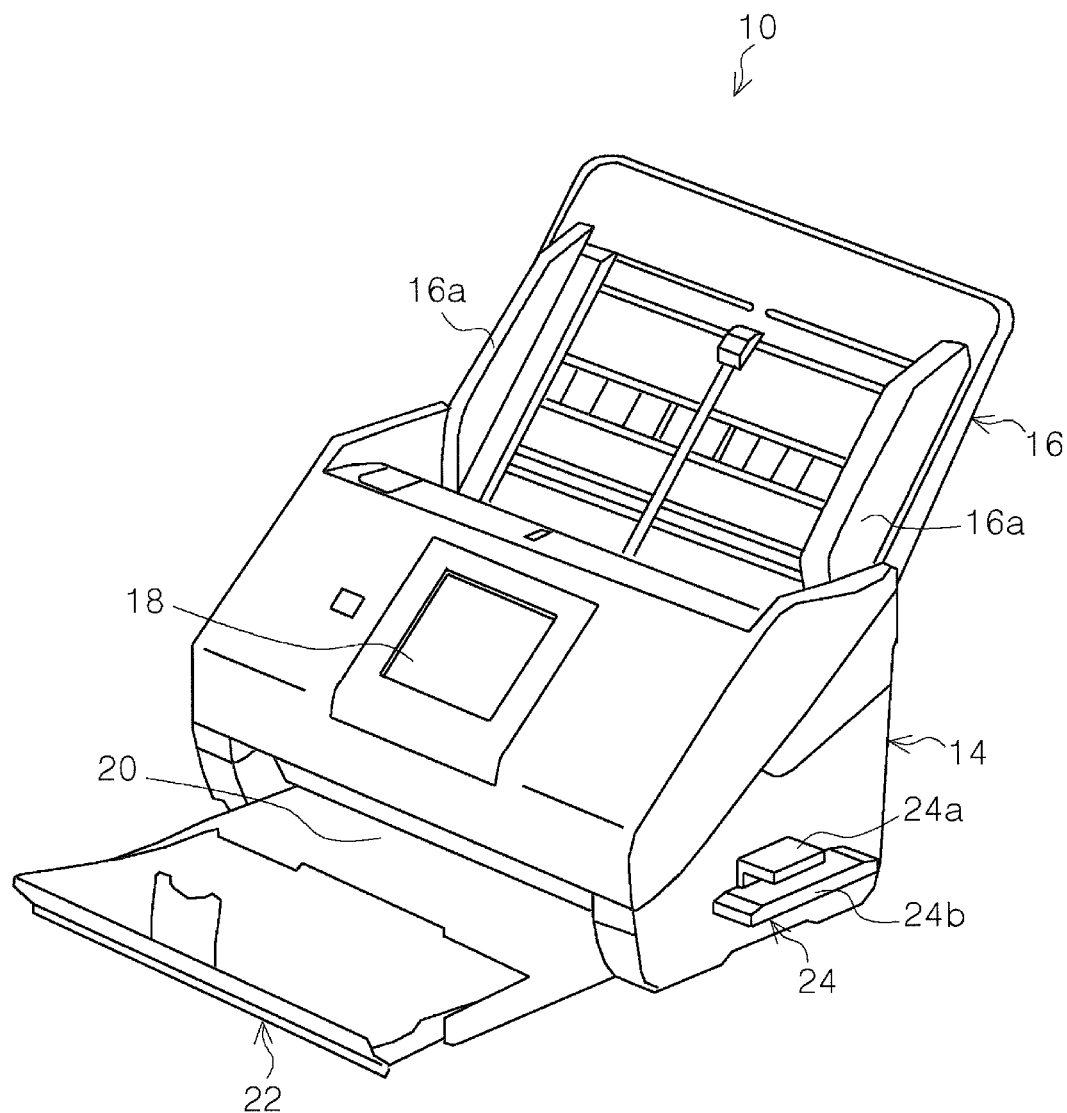
FIG. 1 is an external perspective view of a scanner according to the invention.

Hereinafter, embodiments of the invention will be described based on drawings. In each of the embodiments, the same components are denoted by the same reference numerals, a configuration of only the first embodiment will be described, and descriptions of configurations of the following embodiments will be omitted.

Figure 2:
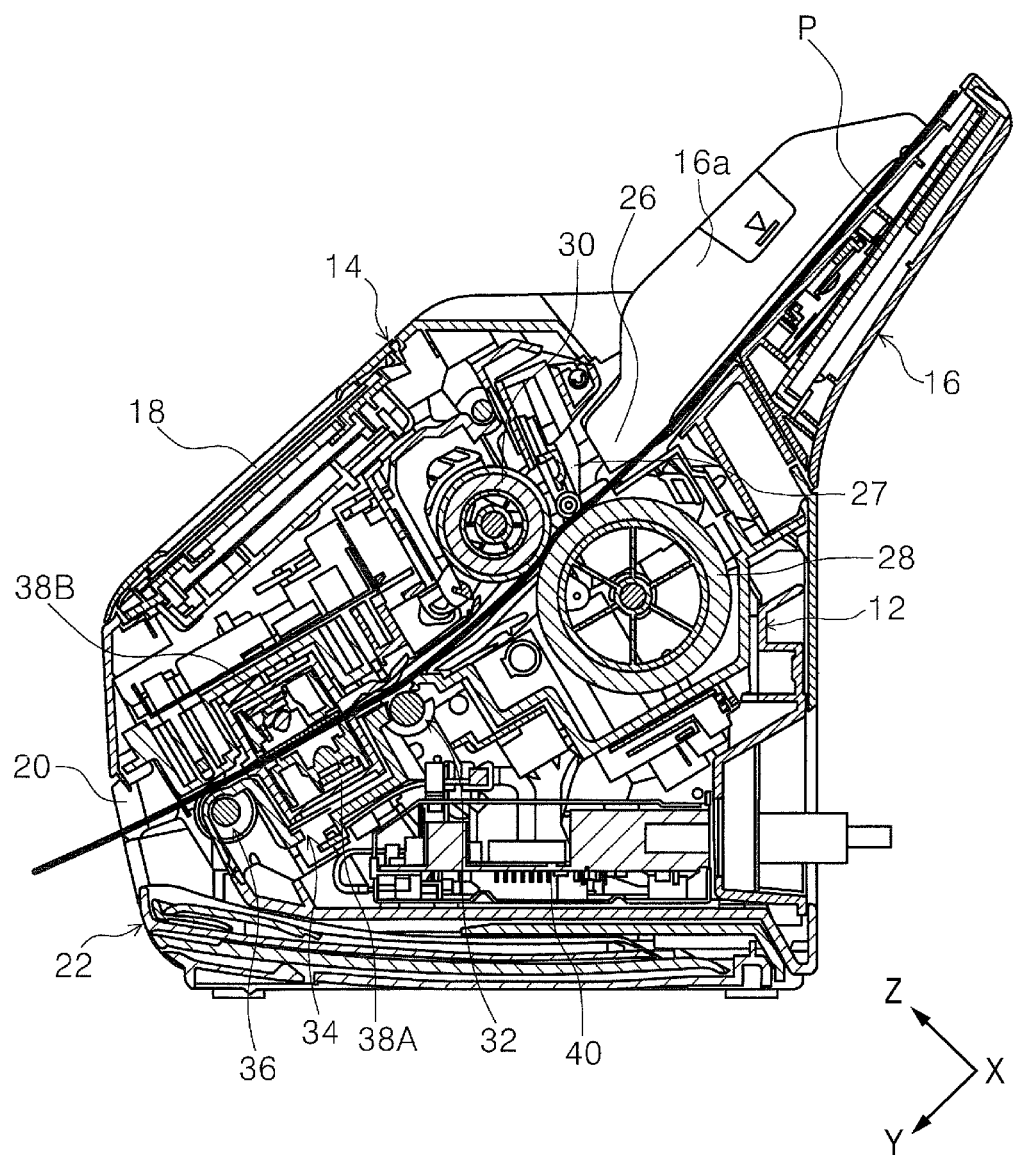
FIG. 2 is a side sectional view illustrating a document transport path of the scanner according to the invention.
Figure 3:
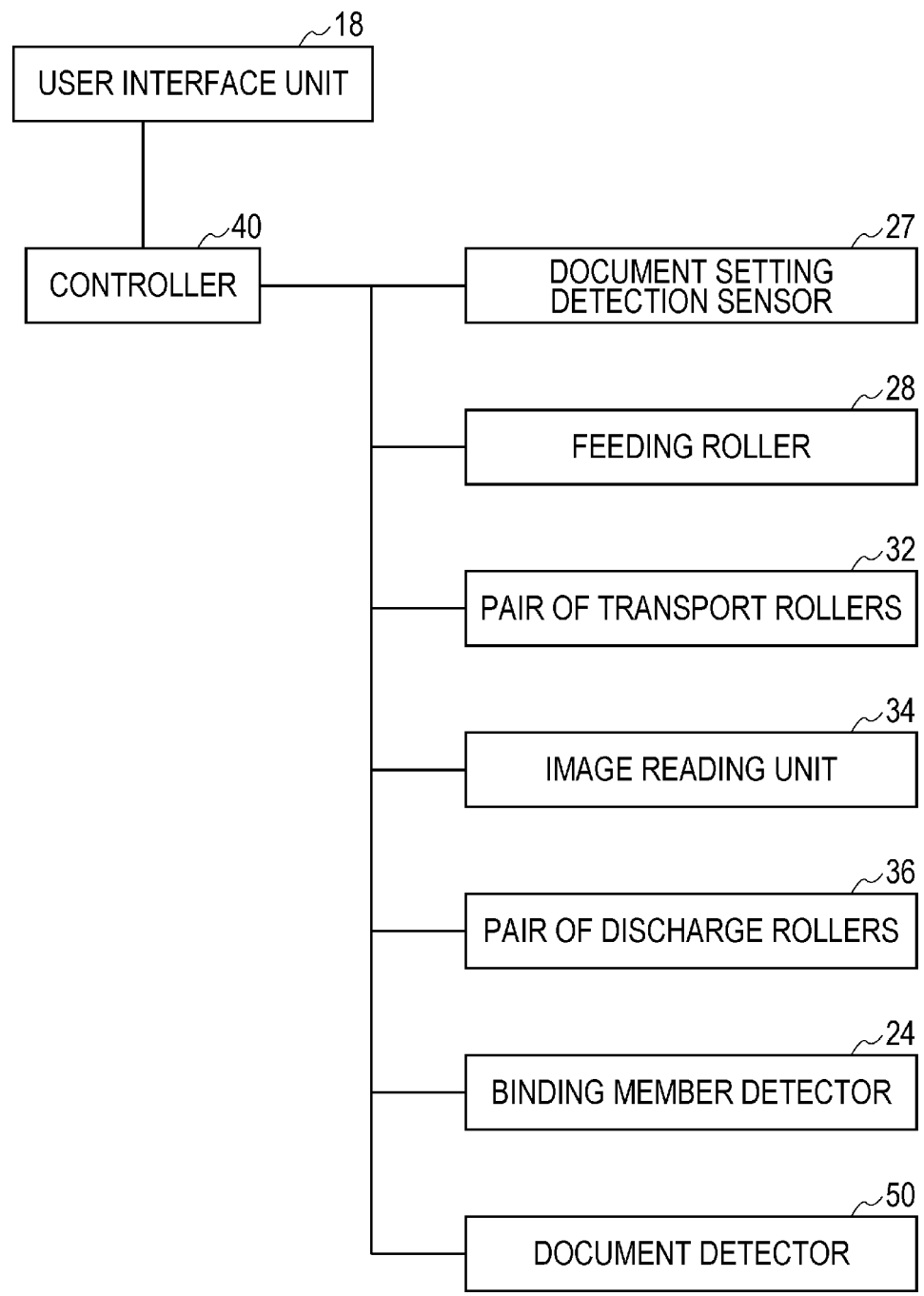
FIG. 3 is a block diagram of the scanner according to the invention.
Figure 4:
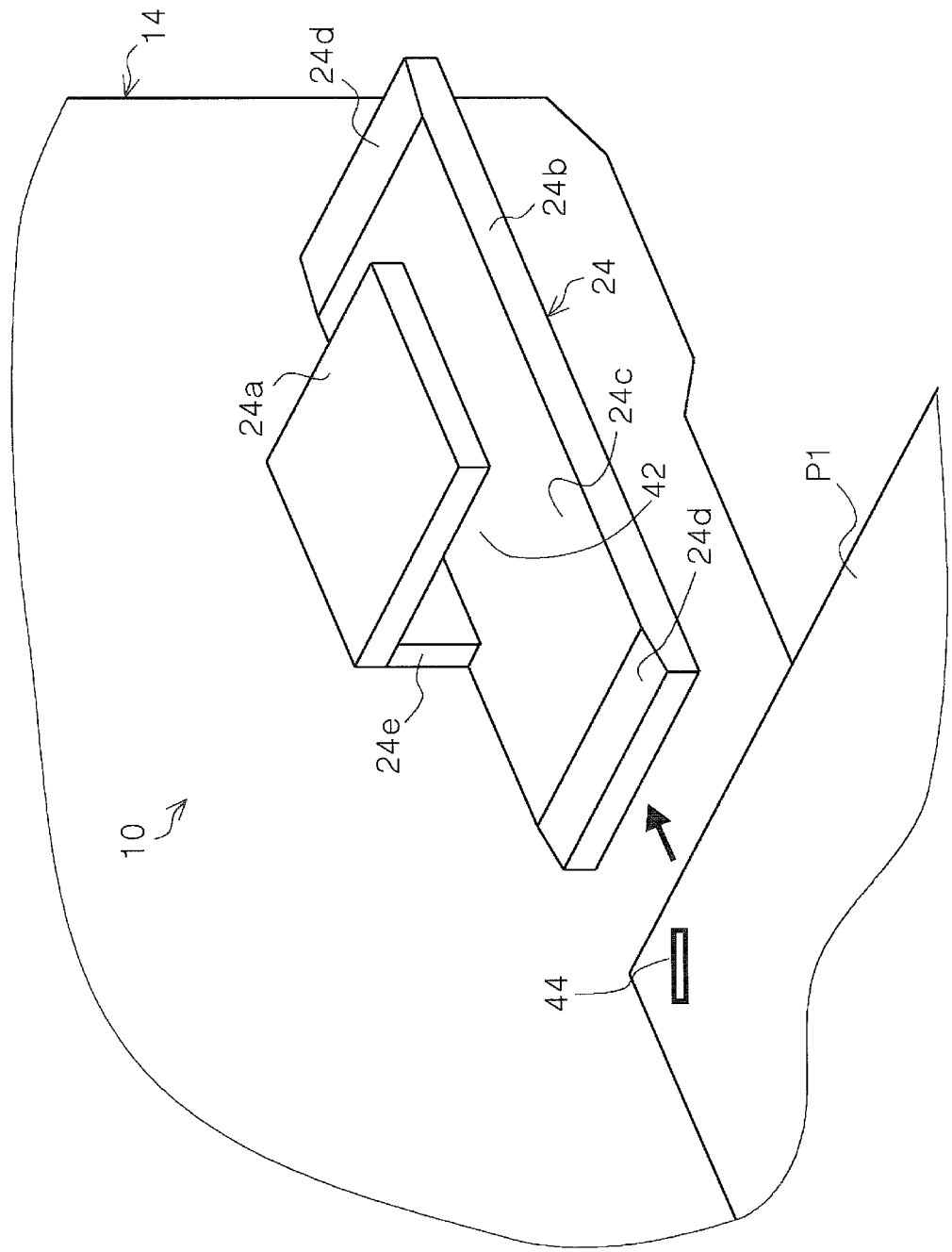
FIG. 4 is a perspective view illustrating a binding member detector.
Figure 5:
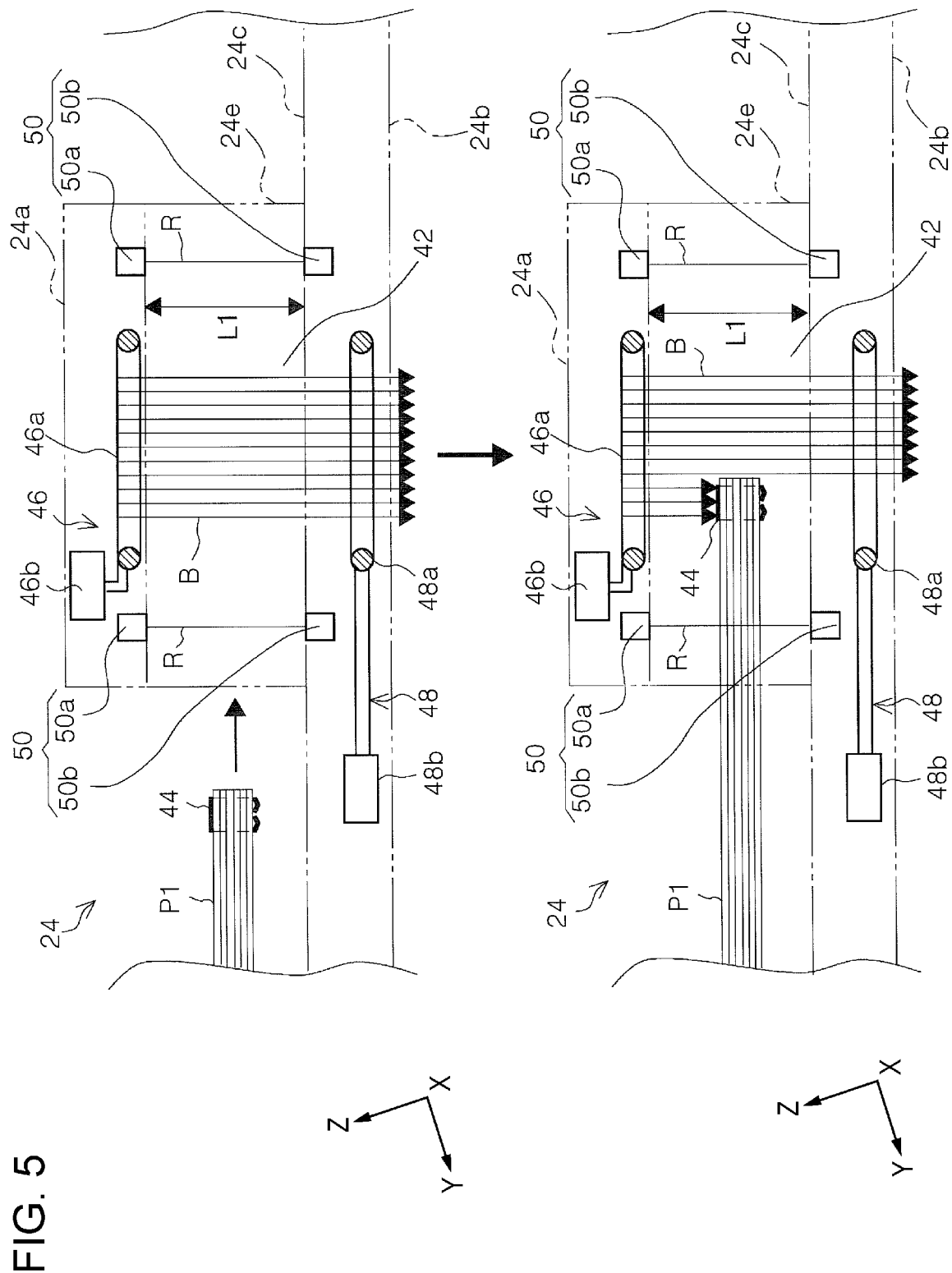
FIG. 5 is a side sectional view illustrating a state in which the binding member detector does not detect a binding member and a state in which the binding member detector detects the binding member.

FIG. 1 is an external perspective view of a scanner according to the invention, FIG. 2 is a side sectional view illustrating a document transport path of the scanner according to the invention, FIG. 3 is a block diagram of the scanner according to the invention, FIG. 4 is a perspective view illustrating a binding member detector, and FIG. 5 is a side view illustrating a state in which the binding member detector does not detect a binding member and a state in which the binding member detector detects the binding member.

Figure 6:
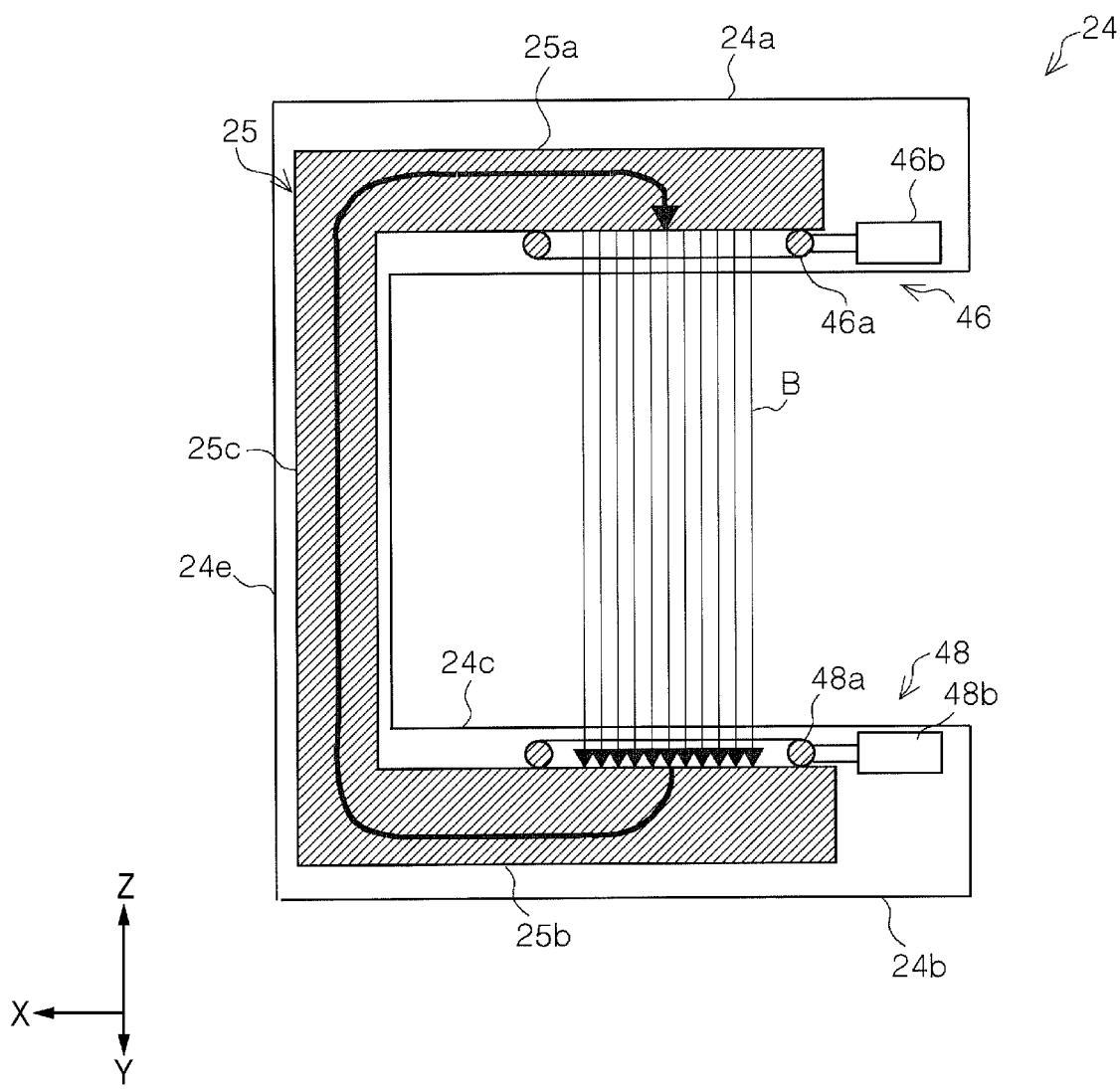
FIG. 6 is a schematic diagram illustrating a flow of a line of magnetic force in the binding member detector.
Figure 7:
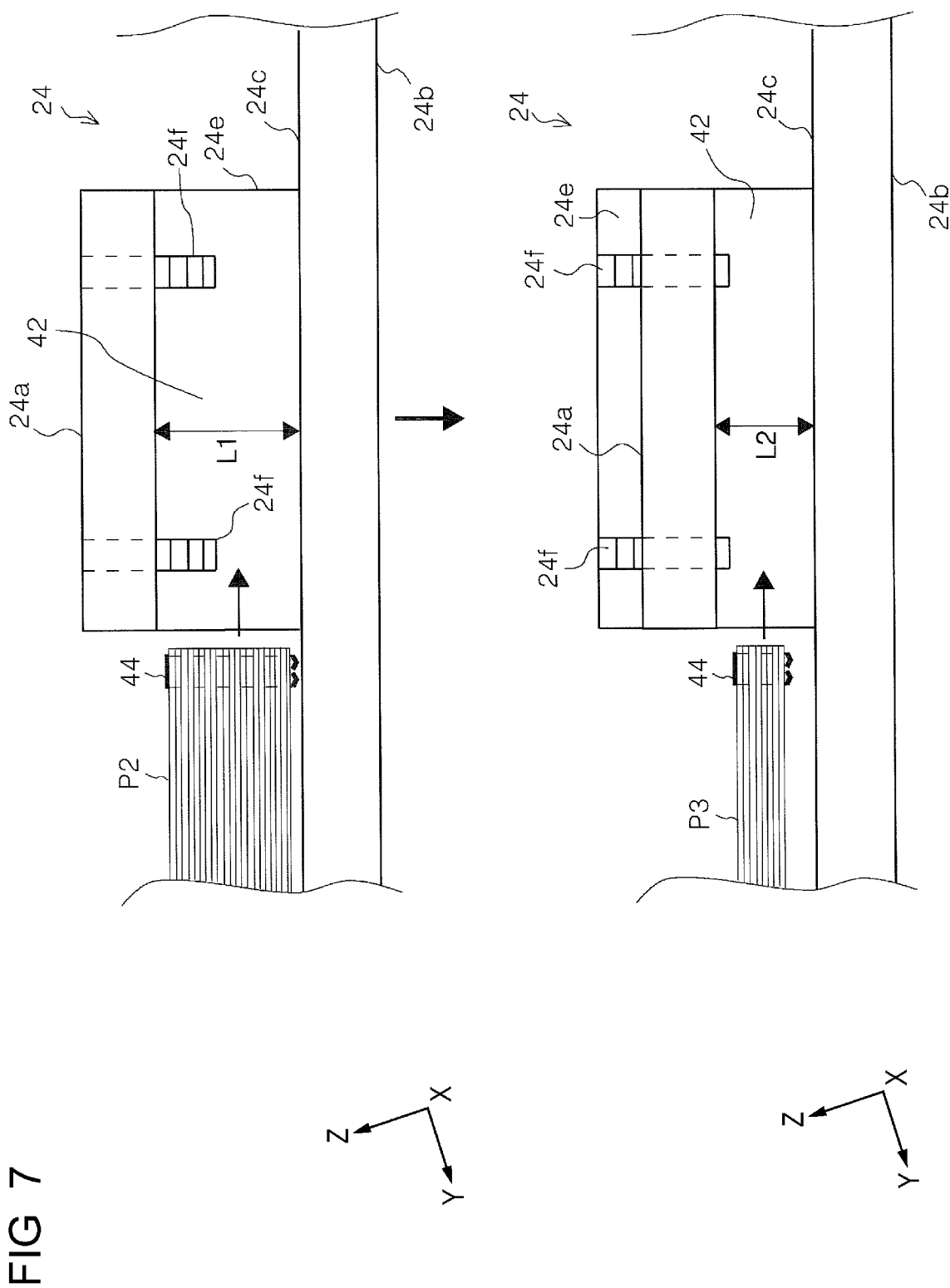
FIG. 7 is a side view illustrating a state in which an interval between a first portion and a second portion in the binding member detector is adjusted.
Figure 8:
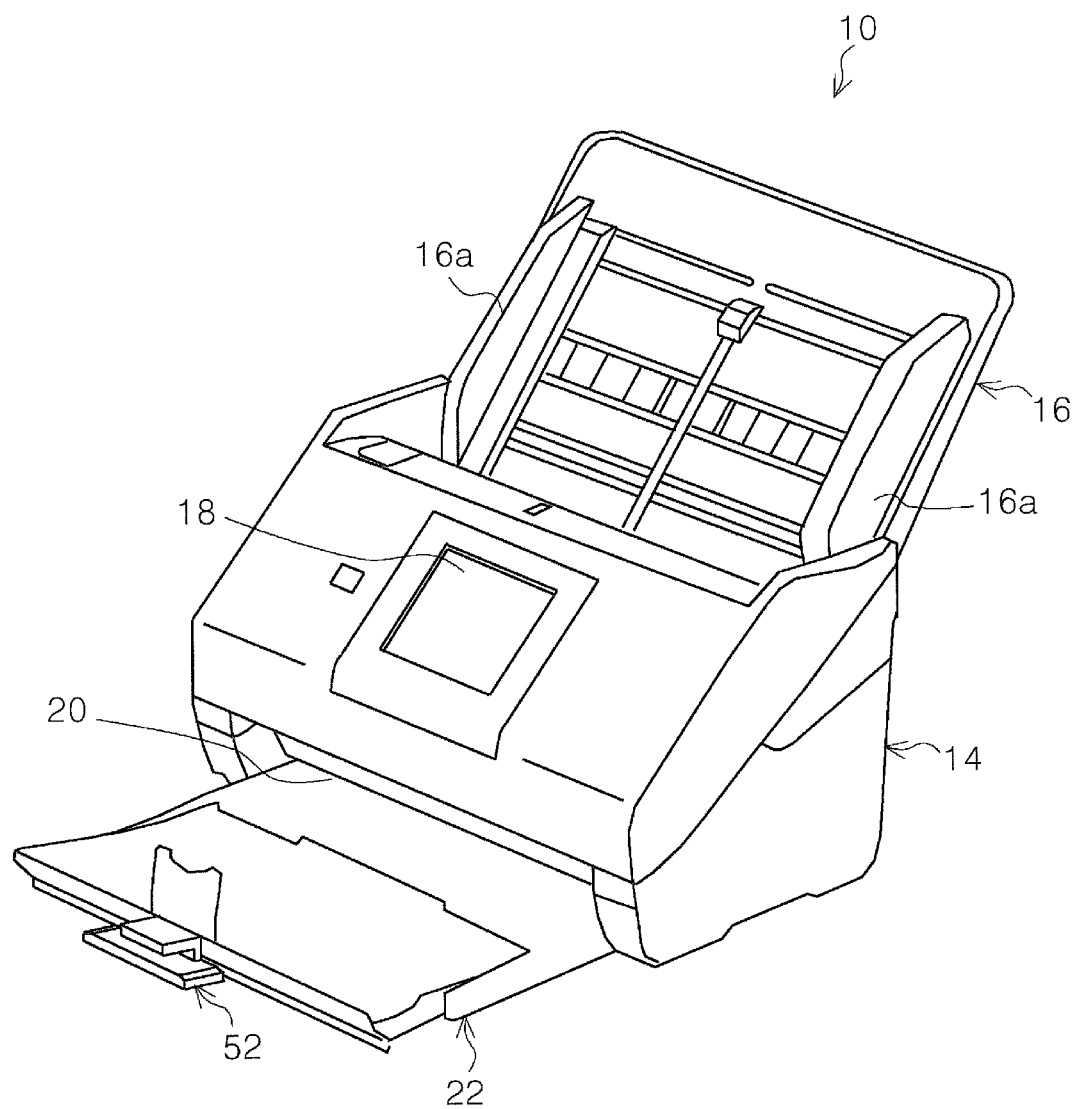
FIG. 8 is a perspective view illustrating a modification example of a binding member detector according to a first embodiment.
Figure 9:
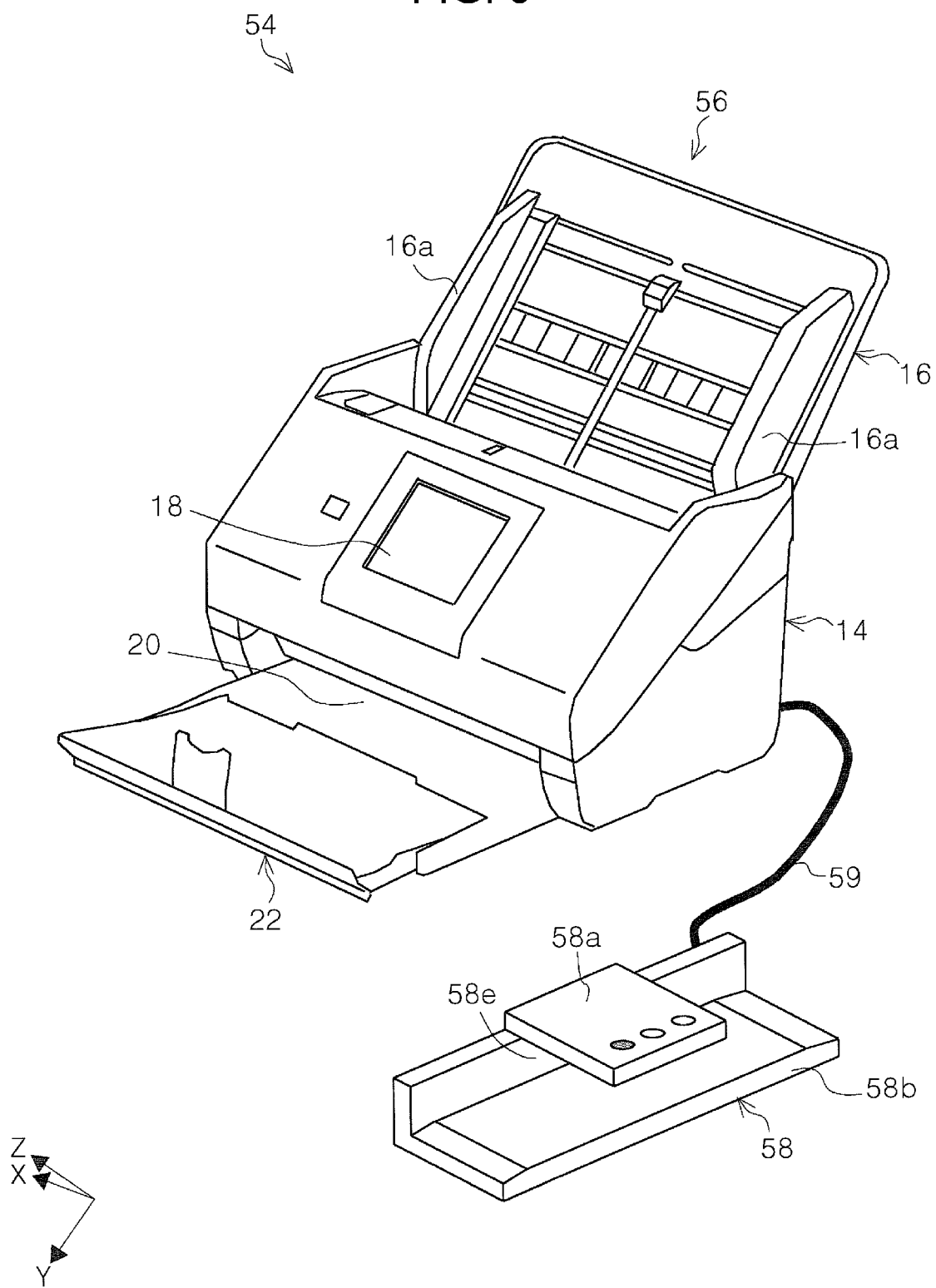
FIG. 9 is an external perspective view of an image reading system according to a second embodiment.

FIG. 6 is a schematic diagram illustrating a flow of a line of magnetic force in the binding member detector, FIG. 7 is a side view illustrating a state in which an interval between a first portion and a second portion in the binding member detector is adjusted, FIG. 8 is a perspective view illustrating a modification example of a binding member detector according to a first embodiment, FIG. 9 is an external perspective view of an image reading system according to a second embodiment, and FIG. 10 is an external perspective view of a binding member detecting apparatus according to the second embodiment.

Figure 11:
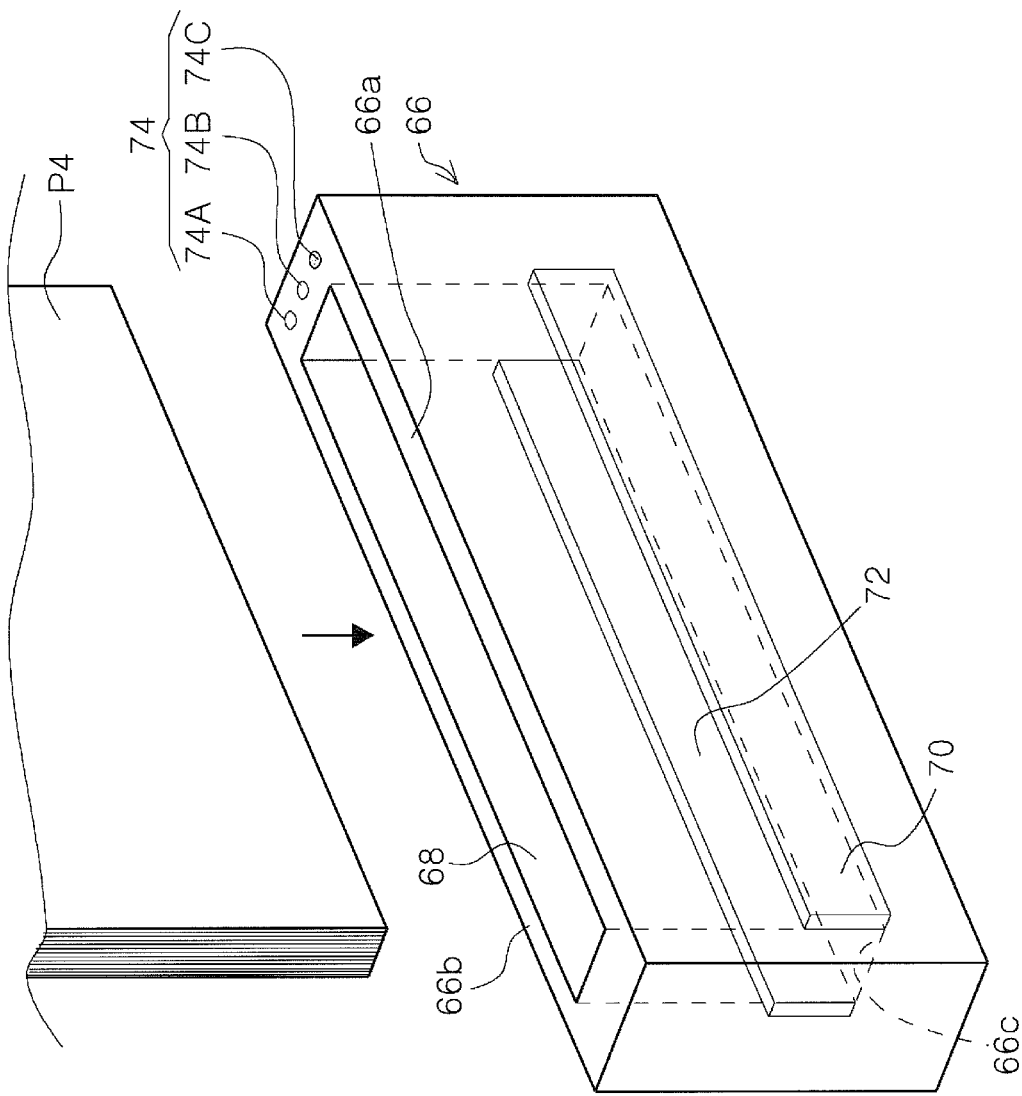
FIG. 11 is an external perspective view of a modification example of a scanner according to the second embodiment.
Figure 12:
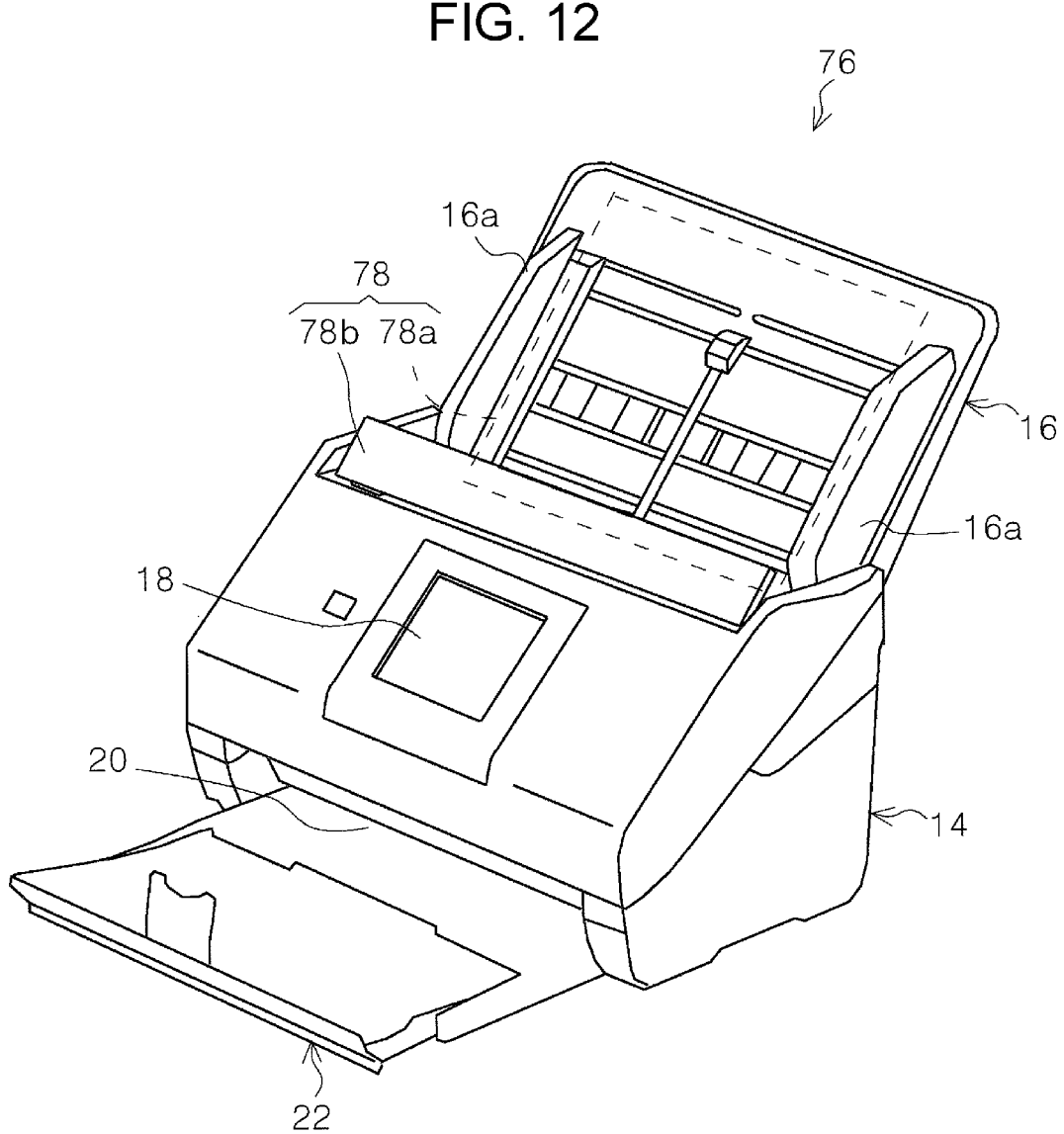
FIG. 12 is an external perspective view of a scanner according to a third embodiment.
Figure 14:
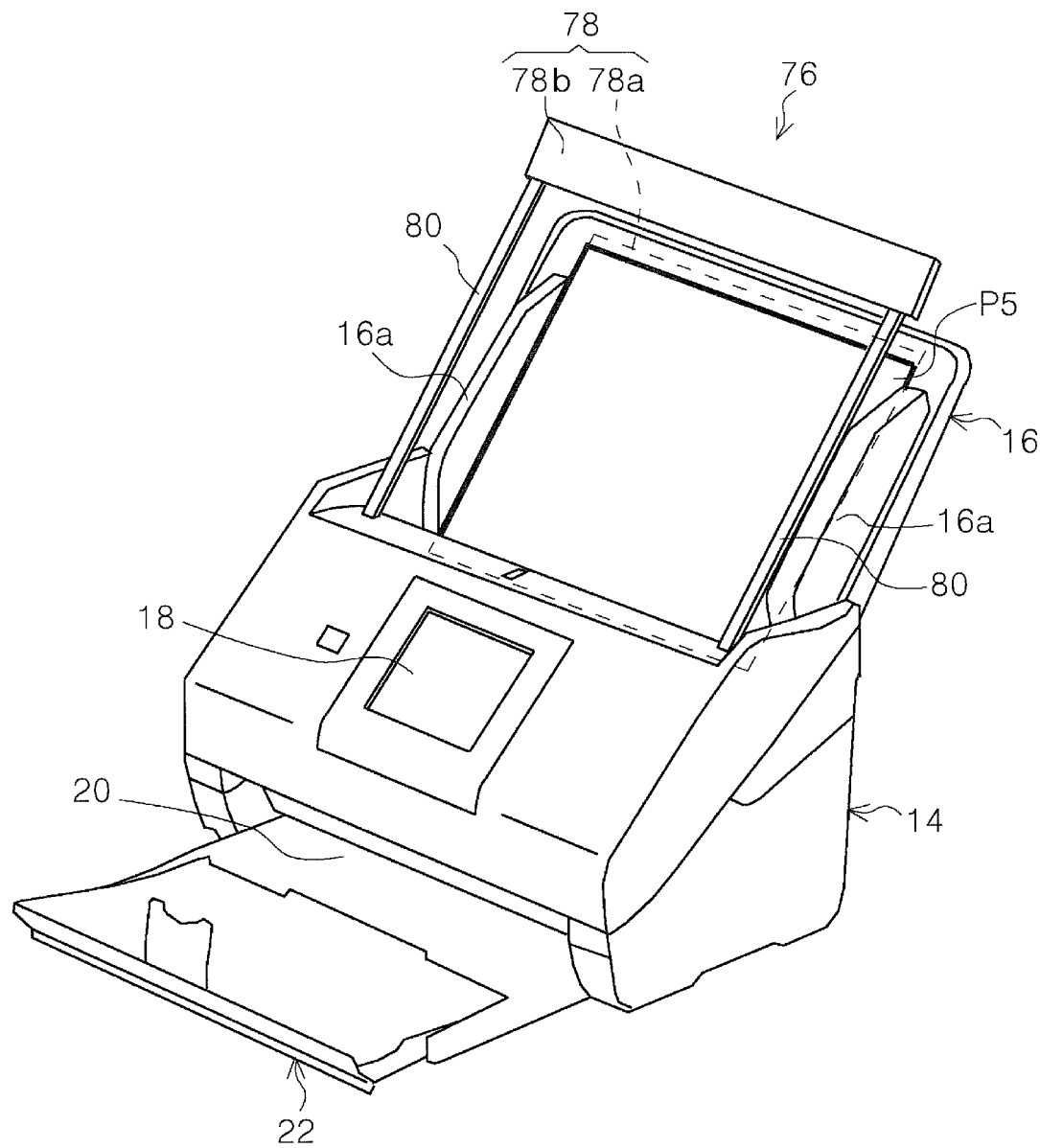
FIG. 14 a perspective view illustrating a state in which a binding member detector is moved in a feeding direction of the document in the scanner according to the third embodiment.

FIG. 11 is an external perspective view of a modification example of a scanner according to the second embodiment, FIG. 12 is an external perspective view of a scanner according to a third embodiment, FIG. 13 is a perspective view illustrating a state in which a document is set to the scanner according to the third embodiment, FIG. 14 a perspective view illustrating a state in which a binding member detector is moved in a feeding direction of the document in the scanner according to the third embodiment, and FIG. 15 is a diagram illustrating another modification example of the binding member detector according to the first embodiment.

Figure 16:
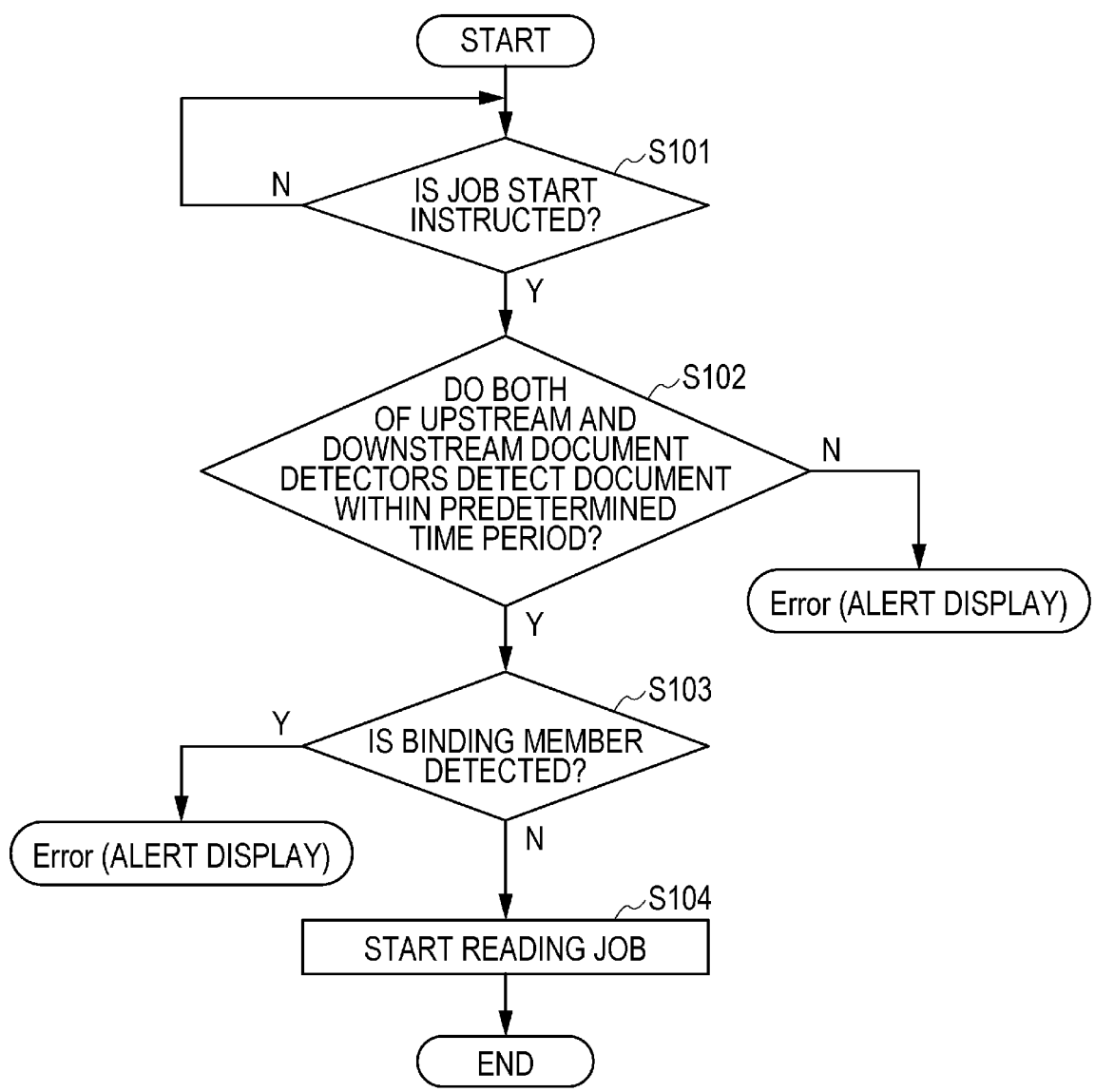
FIG. 16 is a flowchart illustrating a flow of control performed by a controller.
Figure 17:
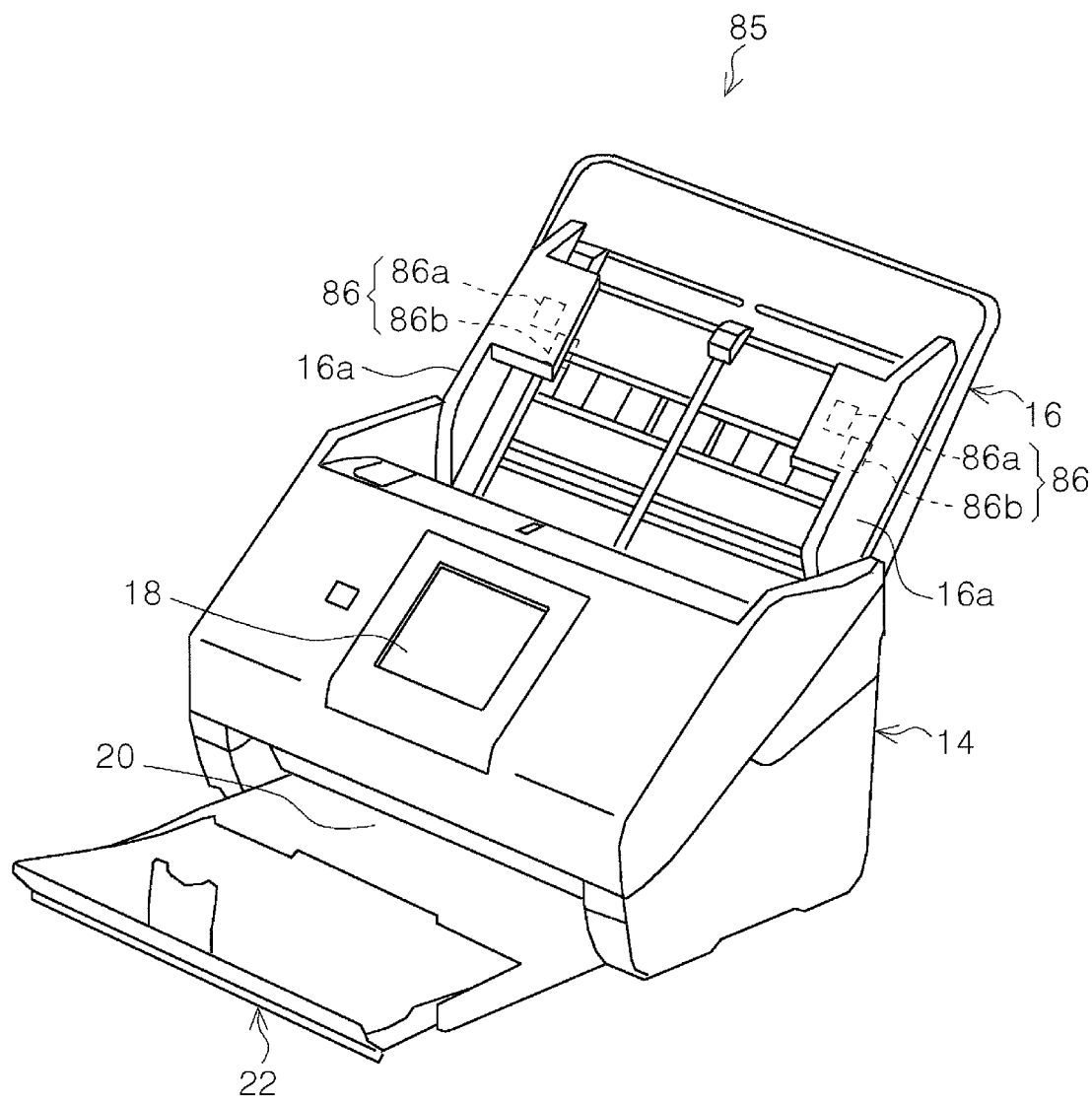
FIG. 17 is an external perspective view of a scanner according to another embodiment.
Figure 18:
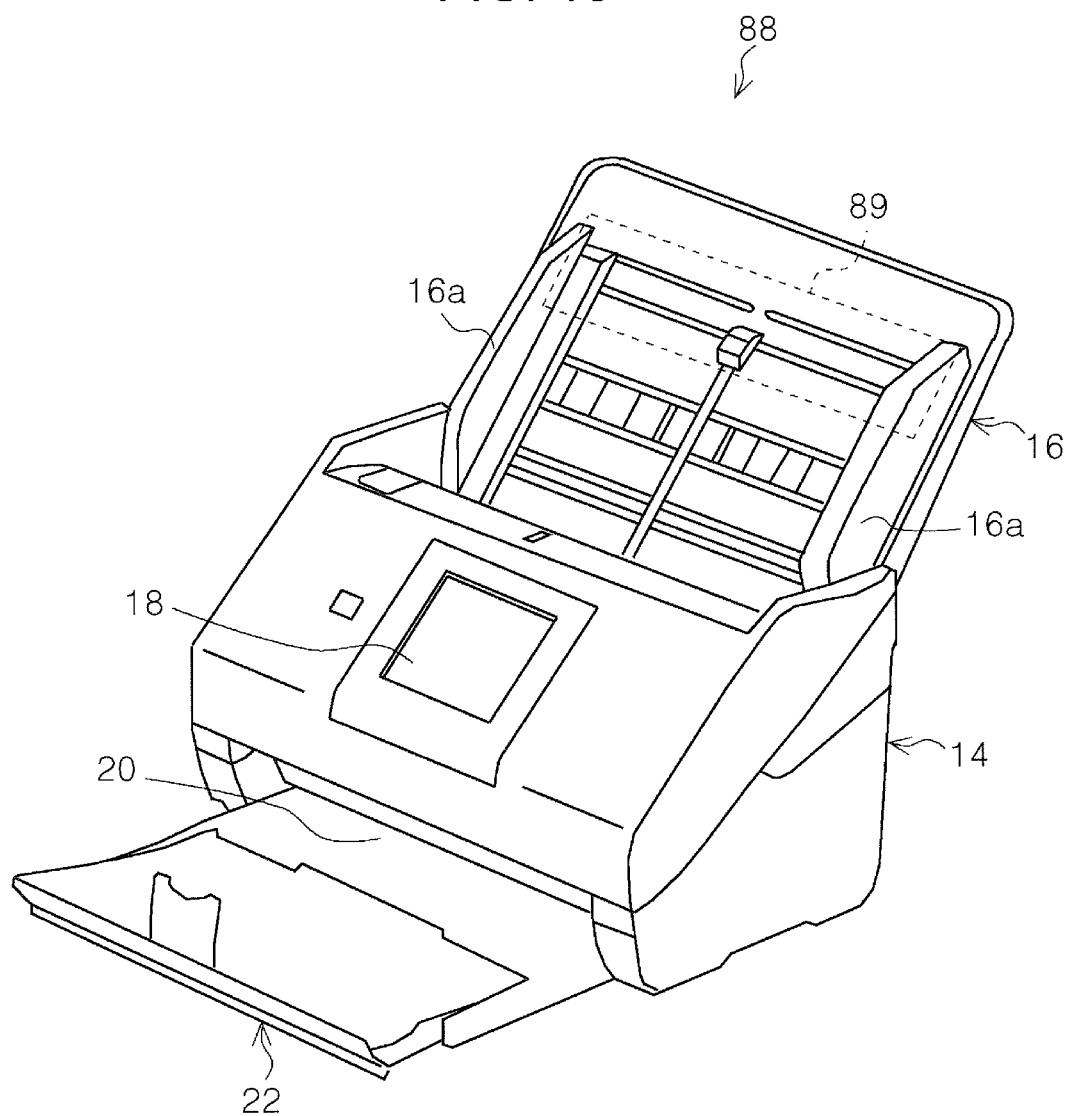
FIG. 18 is an external perspective view of a scanner according to still another embodiment.
Figure 19:
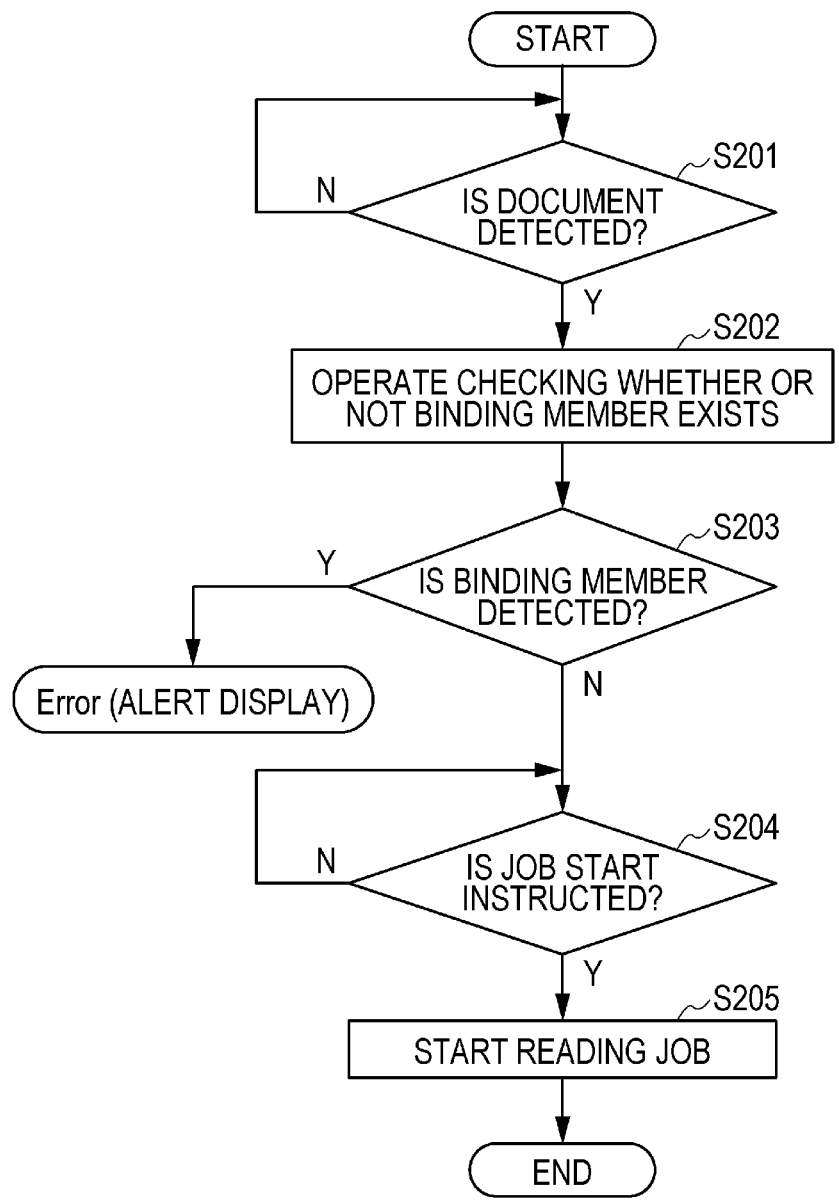
FIG. 19 is a flowchart illustrating a flow of control performed by a controller according to still another embodiment.

FIG. 16 is a flowchart illustrating a flow of control performed by a controller, FIG. 17 is an external perspective view of a scanner according to another embodiment, FIG. 18 is an external perspective view of a scanner according to still another embodiment, and FIG. 19 is a flowchart illustrating a flow of control performed by a controller according to still another embodiment.

In addition, in the X-Y-Z coordinate system illustrated in each of FIGS. 1 to 18, the X direction is an apparatus width direction and a medium width direction, the Y direction is a medium transport direction in an image reading apparatus, and the Z direction is a direction orthogonal to the Y direction and a direction roughly orthogonal to a surface of the medium transported. Further, in each of FIGS. 1 to 18, the +Y direction side is defined as a front surface side of the apparatus and the −Y direction side is defined as a rear surface side of the apparatus.

First Embodiment

Overview of Image Reading Apparatus

In FIG. 1, a scanner 10 will be described as an example of the image reading apparatus. The scanner 10 includes a main body portion 12 (see FIG. 2) and a housing 14 which covers the main body portion 12 and constitutes an external surface of the scanner 10.

A document setting unit 16 which sets the document is provided at an end of the main body portion 12 on a rear surface side of the apparatus. The document setting unit 16 is configured to be able to support the document in an inclined posture. A plurality of sheets of documents can be set in the document setting unit 16. The document setting unit 16 is provided with a pair of edge guides 16a which can be moved in directions to approach each other or in directions to depart from each other and is configured to guide a side portion of the document mounted in the document setting unit 16.

A user interface unit 18 is provided on a front surface side of the housing 14 of the scanner 10 as "notification unit". For example, the user interface unit 18 is configured to include a touch panel and functions as a display unit and an operating unit. By operating the user interface unit 18, it is possible to execute reading operation of the medium of the scanner 10.

A discharge unit 20 is provided below the user interface unit 18 on a front surface side of the scanner 10. A document receiving unit 22 is provided below the discharge unit 20. In the present embodiment, the document receiving unit 22 is configured to switch between a state in which the document receiving unit 22 is in a lower part of the main body portion 12 and is stored inside the main body portion 12 (see FIG. 1) and a state in which the document receiving unit 22 is pulled out from the main body portion 12 to a front surface side (see FIG. 2). For example, a binding member detector 24 described below is provided on a side surface of the housing 14 which is an outside of an installation region of the document setting unit 16.

Document Transport Path

In FIG. 2, a document transport path 26 in the scanner 10 will be described. In FIG. 2, a bold solid line denoted by reference symbol P indicates a guide path of the document transported along the document transport path 26 in the scanner 10.

The main body portion 12 is provided with a document setting detection sensor 27 which detects setting of the document to the document setting unit 16, a feeding roller 28 as "feeding unit", a separating roller 30, a pair of transport rollers 32, an image reading unit 34 as "reading unit", and a pair of discharge rollers 36 from an upstream side (−Y direction side) to a downstream side (+Y direction side) in the transport direction of the document on a path of the document transport path 26 in the main body portion 12. In the present embodiment, the feeding roller 28 is driven to rotate by a driving source (not illustrated) provided in the main body portion 12 as an example.

The separating roller 30 is provided to face the feeding roller 28. The separating roller 30 is provided in a state of being urged against the feeding roller 28 by an urging unit (not illustrated). The separating roller 30 is configured to separate the plurality of sheets of documents so as to transport only the lowest document to be fed to the downstream side in the transport direction when the plurality of sheets of documents insert between the feeding roller 28 and the separating roller 30. The document supported by the document setting unit 16 in an inclined posture is nipped between the feeding roller 28 and the separating roller 30 and is transported to the pair of transport rollers 32 disposed on the downstream side in the transport direction. Next, the pair of transport rollers 32 transports the document sent from the feeding roller 28 toward the image reading unit 34.

The image reading unit 34 includes a first reading unit 38A provided to face a lower surface of the document transported along the document transport path 26, that is, a first surface and a second reading unit 38B provided to face an upper surface of the document transported along the document transport path 26, that is, a second surface. In the present embodiment, the first reading unit 38A and the second reading unit 38B are configured as reading units and are configured as CISMs (contact type image sensor modules) as an example.

The image reading unit 34 reads an image in at least one of the first surface and the second surface of a document P send to the image reading unit 34 by the pair of transport rollers 32, then the document P is nipped by the pair of discharge rollers 36 positioned on the downstream side of the image reading unit 34 in the transport direction and is discharged from the discharge unit 20 to the document receiving unit 22.

Controller

A controller 40 will be described with reference to FIGS. 2 and 3. In present embodiment, the controller 40 is provided in the main body portion 12 illustrated FIG. 2. In present embodiment, the controller 40 is configured to include a plurality of electronic components as electric circuits. As illustrated in FIG. 3, the controller 40 controls reading operation of the first reading unit 38A and the second reading unit 38B, rotation driving of the feeding roller 28, the pair of transport rollers 32, and the pair of discharge rollers 36, and the binding member detector 24 described below.

Further, the controller 40 is configured to control transport of the document P, image reading operation, and binding member detecting operation in the scanner 10 as an example. In addition, the controller 40 may control operation required for executing document reading operation in the scanner 10 according to an instruction from an outside (such as PC).

Binding Member Detector

In FIGS. 4 and 5, a configuration of the binding member detector 24 according to the present embodiment will be described. In FIG. 4, the binding member detector 24 includes a first portion 24a and a second portion 24b. The first portion 24a and the second portion 24b face each other and are disposed to be spaced apart in an apparatus height direction of the scanner 10. A cavity 42 for passing the document is formed between the first portion 24a and the second portion 24b.

In the present embodiment, by passing the document bundle through the cavity 42, the binding member detector 24 detects a binding member 44 (see FIG. 5) which binds the document bundle.

In addition, in the present embodiment, it is assumed the binding member 44 is a binding needle for a stapler formed from a metal member (for example, magnetic substance such as iron or the like).

In the present embodiment, a distance of the cavity 42 between the first portion 24a and the second portion 24b is set to a distance L1 (see FIG. 5). In the present embodiment, the distance L1 corresponds to a maximum loading height of the document settable in the document setting unit 16. Here, a fact that the distance L1 corresponds to the maximum loading height of the document settable in the document setting unit 16 is not limited to a fact that the distance L1 is exactly the same as the maximum loading height of the document settable in the document setting unit 16 and also means a fact that the distance L1 and the maximum loading height include some errors. Specifically, it is preferable to set the distance L1 to be slightly smaller than the maximum loading height of the document settable in the document setting unit 16. Accordingly, it is possible to more reliably prevent the document setting unit 16 from being set to the document having a height equal to or more than the maximum loading height.

In FIG. 4, a guide surface 24d which guides a document bundle toward the cavity 42 is formed at each of both ends of an upper surface 24c of the second portion 24b in front/rear directions of the apparatus.

In FIG. 5, detection of the binding member 44 by the binding member detector 24 will be described. In the present embodiment, a magnetic field generator 46 is provided in the first portion 24a. The magnetic field generator 46 includes an oscillation coil 46a and an oscillation circuit 46b. The oscillation circuit 46b is electrically connected to the controller 40 and is controlled by the controller 40. For example, the oscillation coil 46a generates a magnetic field toward a magnetic field detector 48 provided on a side of the second portion 24b. The magnetic field generated by the oscillation coil 46a is controlled by the controller 40 via the oscillation circuit 46b and oscillation frequency and oscillation strength can be changed.

For example, the magnetic field detector 48 includes a detecting coil 48a and a galvanoscope 48b connected to both ends of the detecting coil 48a. In the present embodiment, the galvanoscope 48b is electrically connected to the controller 40. The galvanoscope 48b is configured to transmit a detecting signal to the controller 40 when detecting a change in a magnetic field B. The present embodiment may include the galvanoscope, but the present embodiment may include a pressure detector.

The magnetic field B (a plurality of arrows extended in a lower side direction in FIG. 5) generated from the oscillation coil 46a of the magnetic field generator 46 penetrates in a direction orthogonal to the detecting coil 48a. Since a magnetic flux Φ obtained by magnetic field B passing through the detecting coil 48a is changed, an electromagnetic induction phenomenon occurs and induced electromotive force is generated at both ends of the detecting coil 48a. In the present embodiment, a change in an induced current flowing by the induced electromotive force is detected by the galvanoscope 48b. In a case of the pressure detector, the pressure detector detects a change of the induced electromotive force.

As illustrated in FIGS. 4 and 6, the first portion 24a and the second portion 24b are connected with a connecting portion 24e. As illustrated in FIG. 6, a frame member 25 which corresponds a cross sectional shape of the binding member detector 24 is provided inside the first portion 24a, the second portion 24b, and the connecting portion 24e. In the present embodiment, the frame member 25 is made of a metallic member which is easy to pass through a line of magnetic force. In the present embodiment, the frame member 25 includes a first portion 25a, a second portion 25b, and a connecting portion 25c. The oscillation coil 46a is disposed on a side of the first portion 25a of the frame member 25 and the detecting coil 48a is disposed on a side of the second portion 25b of the frame member 25.

The magnetic field B oscillated and formed by the oscillation coil 46a is directed toward the detecting coil 48a. In the present embodiment, the line of magnetic force of the magnetic field B passed through the detecting coil 48a passes through the frame member 25 in order of the second portion 25b, the connecting portion 25c, and the first portion 25a of the frame member 25 and returns to a side of the oscillation coil 46a. A bold line in FIG. 6 schematically illustrates a flow of the line of magnetic force in the frame member 25.

In the present embodiment, since the line of magnetic force passes through the frame member 25 to return from the detecting coil 48a to the oscillation coil 46a, it is possible to simultaneously suppress influence of a disturbance by the binding member detector 24, to reduce a leak of the line of magnetic force from the binding member detector 24 to an outside, and to suppress that the magnetic field has a bad influence on the outside of the binding member detector 24.

In FIGS. 4 and 5, an operation of detecting the binding member will be described. In the present embodiment, as illustrated in the upper diagram of FIGS. 4 and 5, as a procedure of detecting the binding member 44 by a user, an end of the document bundle P1 which is a plurality of documents P bound by the binding member 44 passes from a front surface side of the apparatus to a rear surface side of the apparatus via the cavity 42 of the binding member detector 24. At this time, as illustrated in the lower diagram of FIG. 5, in a case where the binding member 44 exists in the end of the document bundle P1, when the document bundle P1 crosses the magnetic field B, the binding member 44 also crosses the magnetic field B. As a result, the magnetic flux Φ of the magnetic field B is changed by the binding member 44, so that the induced current is changed. Then, the galvanoscope 48b detects the change in the induced current. In the present embodiment, the end of the document bundle P1 passes through the cavity 42 from the front surface side of the apparatus, but the end of the document bundle P1 may be passed through the cavity 42 from the rear surface side of the apparatus.

The galvanoscope 48b transmits a detecting signal to the controller 40 when detecting the change in the magnetic field B. When receiving the detecting signal, the controller 40 displays a warning message that the binding member detector 24 detects the binding member 44, that is, an example of notification to the user interface unit 18 as a notification unit.

Then, the user can avoid that the document bundle P1 bound by the binding member 44 erroneously sets as it is and feeding is started, so the document is torn.

In addition, in the present embodiment, the binding member detector 24 includes at least a document detector 50. In the present embodiment, as illustrated in the upper diagram of FIG. 5, the document detector 50 is disposed in each of an upstream side and a downstream side of the magnetic field B in a transport direction of the document bundle P1 between the first portion 24a and the second portion 24b. In the present embodiment, the document detector 50 is configured to include an optical sensor, for example, is configured to include a transmissive sensor. For example, the document detector 50 includes a light emitting unit 50a provided at the first portion 24a and a light receiving unit 50b provided at the second portion 24b. The document detector 50 is electrically connected with the controller 40 and is configured to transmit the detecting signals to the controller 40.

For example, as illustrated in the upper diagram of FIG. 5, when the document bundle P1 passes from the front surface side of the apparatus to the rear surface side of the apparatus via the cavity 42, the document bundle P1 crosses an optical axis R (fine line denoted by reference symbol R in FIG. 5) between the light emitting unit 50a and the light receiving unit 50b in the document detector 50. Accordingly, the document detector 50 detects that the document bundle P1 is inserted in the cavity 42 and transmits the detecting signal to the controller 40.

In the present embodiment, for example, the controller is set to receive the detecting signal from the document detector 50 in a case where the user inputs an instruction to operate the document feeding operation to the user interface unit 18. Then, the controller 40 is set to start the document feeding operation in a case where the binding member detector 24 does not detect the binding member 44.

Hereinafter, the operation will be described in detail. As illustrated in the upper diagram of FIG. 5, when the document bundle P1 passes from the front surface side of the apparatus via the cavity 42, the document bundle P1 crosses the optical axis R of the document detector 50 disposed on the front surface side of the apparatus (hereinafter, referred to as "upstream side in document moving direction") at first and is detected by the document detector 50 on the upstream side.

Next, when the document bundle P1 is moved to the downstream side in the document moving direction, depending on a position at which the binding member 44 binds the document bundle P1 in the document moving direction, but in the case illustrated in FIG. 5, after detection by the document detector 50 on the upstream side, the binding member 44 crosses the magnetic field B and a binding member detecting signal is transmitted to the controller 40. Further, when the document bundle P1 is moved to the downstream side in the document moving direction, the document bundle P1 crosses the optical axis R of the document detector 50 on the downstream side (rear surface side of apparatus) and the document detector 50 on the downstream side detects the document bundle P1.

According to the position at which the binding member 44 binds the document in the document moving direction, in some times, a timing when the magnetic field detector 48 detects the binding member 44 and a timing when the document detector 50 on the downstream side detects the document bundle P1 may be reversed. For example, FIG. 5 illustrates a state in which the binding member 44 is on a tip side of the document in the document moving direction. On the other hand, in a case where the binding member 44 is on a rear end side of the document in the document moving direction, after the document detector 50 on the downstream side detects the document bundle P1, the binding member 44 is detected.

The controller 40 receives both of the detecting signal from the document detector 50 on the upstream side and the detecting signal from the document detector 50 on the downstream side and determines whether or not the document bundle P1 passes through the binding member detector 24. When the binding member detector 24 performs the detecting operation, the controller 40 writes information on a time of the detecting operation and a detecting result (whether or not document is normally passed through binding member detector 24 and binding member is detected) in a storage unit (not illustrated). The fact that the document is normally passed through the binding member detector 24 means a state in which both of the document detectors 50 on the upstream side and the downstream side detect the document when the document passes through the cavity 42.

After then, for example, it is determined whether or not the binding member detector 24 performs the detecting operation within a predetermined time period (for example, within one minute) from a case where the instruction to start the feeding operation is input. The controller 40 reads the information on the time of the detecting operation and the detecting result (whether or not document is normally passed through binding member detector 24 and binding member is detected) stored in the storage unit (not illustrated).

When the binding member detector 24 does not perform the detecting operation within the predetermined time period after the instruction to start the feeding operation is input, the feeding operation is not started and the controller 40 displays the warning message (for example, "Perform operation of detecting binding member, please") or the like to the user interface unit 18.

Accordingly, since the binding member detector 24 obligatorily performs the operation of detecting the binding member 44 before the document P is fed from the document setting unit 16, it is possible to prevent the document bundle P1 bound by the binding member 44 as it is being fed from the document setting unit 16 and to reliably suppress damage to the document.

At this time, in a case where the detection result indicates that the binding member 44 is detected again, the feeding operation is not started and the controller 40 displays the warning message (for example, "Binding member is detected. Check, please") or the like to the user interface unit 18.

For example, even if the detecting operation is started, in a case where both of the document detector 50 on the upstream side and the document detector 50 on the downstream side do not detect the document bundle P1, or a case where one of the document detector 50 on the upstream side and the document detector 50 on the downstream side does not detect the document bundle P1, it is considered the detecting operation is not normally ended, the feeding operation is not started, and the controller 40 displays the warning message (for example, "Perform operation of detecting binding member again, please") or the like to the user interface unit 18.

The flowchart in FIG. 16 illustrates the flow of the control described above. When receiving an instruction to start a scanning job, that is, the instruction to start the feeding operation (Yes in step S101), the controller 40 determines whether or not the upstream and downstream document detectors 50 included in the binding member detector 24 detect the document within the predetermined time period after the instruction is received (step S102). When the document is detected (Yes in step S102), it is determined whether or not the binding member 44 is detected (step S103) and when the binding member 44 is not detected (No in step S103), a reading job, that is, the feeding operation is started (step S104).

On the other hand, in a case where the upstream and downstream document detectors 50 included in the binding member detector 24 do not detect the document within the predetermined time period after the instruction to start the scanning job, that is, the instruction to start the feeding operation is received (No in step 102), or a case where the binding member detector 24 does not detect the binding member 44 (Yes in step S103), the controller 40 displays an alert message to the user interface unit 18 and performs an error end.

As another example of binding member detecting control by the controller 40, the controller 40 may perform the following processes based on receiving of the detecting signal (of detecting a state in which document is set to document setting unit 16) from the document setting detection sensor 27 (see FIGS. 2 and 3). For example, in a case where the controller 40 determines that the document is set to the document setting unit 16 based on the detecting signal from the document setting detection sensor 27, the controller 40 determines whether or not both of the document detector 50 on the upstream side and the document detector 50 on the downstream side detect the document and the binding member detector 24 detects the binding member 44 within a predetermined time period immediately before the detecting signal is received.

In a case where one of the document detector 50 on the upstream side and the document detector 50 on the downstream side does not detect the document, the controller 40 displays the warning message (for example, "Perform operation of detecting binding member, please") or the like to the user interface unit 18. Alternatively, even if both of the document detector 50 on the upstream side and the document detector 50 on the downstream side do not detect the document, in a case where the binding member 44 is detected, the controller 40 displays the warning message (for example, "Binding member is detected. Check, please") or the like to the user interface unit 18.

In a case where both of the document detector 50 on the upstream side and the document detector 50 on the downstream side detect the document and the binding member is not detected, the controller 40 accepts the following processes, specifically the reading job.

In the present embodiment, as illustrated in FIG. 5, in a case where both of the document detector 50 on the upstream side and the document detector 50 on the downstream side detect the document, the controller 40 determines that the document is normally passed through the binding member detector 24. Further, in a case where the magnetic field detector 48 detects the change in the magnetic field B when the document bundle P1 crosses the magnetic field B, information (binding member detecting signal) on detection of the change in the magnetic field B is transmitted to the controller 40. As a result, the controller 40 determines that the binding member 44 is detected in a state in which the document is normally passed through the binding member detector 24.

On the other hand, in a state in which the controller 40 does not receive the information on the detection is transmitted from the document detector 50, for example, even in a case where both of the document detector 50 on the upstream side and the document detector 50 on the downstream side do not detect the document bundle P1 or a case where one of the document detector 50 on the upstream side and the document detector 50 on the downstream side does not detect the document bundle P1, the magnetic field detector 48 detects the change in the magnetic field B and the information on the detection of the change in the magnetic field B is transmitted to the controller 40. In this case, it is considered that the magnetic field B is changed due to a disturbance factor. The disturbance factor includes, for example, a case where an electromagnetic wave emitted from an electronic apparatus is detected, a case where an object having a magnetic force approaches the binding member detector 24, and the like.

In the present embodiment, in case of receiving the information on the change in the magnetic field B, the controller 40 is configured to execute a predetermined process. Specifically, as an example of the predetermined process, the controller 40 displays the warning message to the user interface unit 18 as the notification unit. By displaying the warning message, it is possible to urge the user to retry the operation of detecting the binding member and to appropriately detect the binding member 44.

As an example of another process, in a state in which the magnetic field generator 46 stops to generate the magnetic field B, the magnetic field detector 48 detects the change in the magnetic field. Based on the detecting result, the controller 40 can detect the change in the magnetic field in a non-oscillation state of the magnetic field generator 46. In the present embodiment, for example, by comparing information on the detection of the change in the magnetic field B in an oscillation state of the magnetic field generator 46 with information on the detection of a change in time in the non-oscillation state, the controller 40 can increase detection accuracy of the change in the magnetic field B in the oscillation state of the magnetic field generator 46, that is, accuracy of detecting the binding member 44.

Modification Example of First Embodiment (1) In the present embodiment, the distance L1 between the first portion 24*a* and the second portion 24*b* is fixed, but instead of this configuration, the interval between the first portion 24*a* and the second portion 24*b* may be changeable. More specifically, as illustrated in FIG. 7, a first portion position adjusting unit 24*f* is provided in the connecting portion 24*e*. In the present embodiment, for example, the first portion position adjusting unit 24*f* is configured to include a guide mechanism, a link mechanism, and the like. The first portion 24*a* is displaceable in a direction to separate from the second portion 24*b*. By the first portion 24*a* approaching or separating from the second portion 24*b*, it is possible to change the interval between the first portion 24*a* and the second portion 24*b* from the distance L1 to the distance L2. Here, the distance L2 is set to be smaller than the distance L1.

In the present embodiment, as illustrated in the upper diagram of FIG. 7, in a case where a document bundle P2 corresponding to the maximum loading height of the document settable to the document setting unit 16 passes through the binding member detector 24, the first portion position adjusting unit 24*f* adjusts a position of the first portion 24*a* for the second portion 24*b* so that the interval between the first portion 24*a* and the second portion 24*b* becomes the distance L1.

On the other hand, as illustrated in the lower diagram of FIG. 7, in a case where a document bundle P3 having the number of sheets equal to or smaller than the maximum loading height of the document settable to the document setting unit 16 passes through the binding member detector 24, the first portion position adjusting unit 24*f* adjusts the position of the first portion 24*a* for the second portion 24*b* so that the interval between the first portion 24*a* and the second portion 24*b* becomes the distance L2 smaller that the distance L1 from the distance L1.

In the present embodiment, since the interval (cavity 42) between the first portion 24*a* and the second portion 24*b* is changeable according to a thickness of the document bundle passed between the first portion 24*a* and the second portion 24*b*, it is possible to adjust an output for detecting the binding member 44, for example, an intensity of the magnetic field formed by the oscillation coil 46*a* of the magnetic field generator 46. As a result, for example, by decrease the interval (cavity 42) between the first portion 24*a* and the second portion 24*b*, it is possible to weaken the magnetic field and to suppress that the magnetic field has a bad influence on the scanner 10 or a peripheral of the scanner 10. In the present modification example, the position of the first portion 24*a* for the second portion 24*b* is changed, but instead of this configuration, the position of the second portion 24*b* for the first portion 24*a* may be changed.

In addition, by adjusting the interval between the first portion 24*a* and the second portion 24*b* in this way, one type of the binding member detector 24 can correspond to a plurality of different models of image reading apparatuses. That is, it is possible to facilitate variation development of the scanner 10 by sharing parts. This also applies to the second embodiment to be described below.

(2) In the present embodiment, the binding member detector 24 is configured to include the magnetic field generator 46 as a oscillation coil and the magnetic field detector 48 as a detecting coil, but instead of this configuration, the magnetic field generator 46 may be configured by a permanent magnet or an electromagnet and the magnetic field detector 48 may be a magnetic force detection sensor such as a Hall element. Alternately, the binding member detector 24 may be configured to include only a coil on a side of the magnetic field generator 46 as a single coil resonance type not requiring a coil on a side of the magnetic field detector 48. This also applies to the second embodiment and the third embodiment to be described below.

(3) In the present embodiment, the document detector 50 is a transmissive optical sensor, the light emitting unit 50*a* is provided in the first portion 24*a*, and the light receiving unit 50*b* is provided in the second portion 24*b*, but instead of this configuration, the light receiving unit 50*b* may be provided in the first portion 24*a* and the light emitting unit 50*a* may be provided in the second portion 24*b* or the document detector 50 may be provided as a reflective type of optical sensor and a sensor may be disposed in one of the first portion 24*a* and the second portion 24*b*. This also applies to the second embodiment to be described below.

(4) In the present embodiment, the binding member detector 24 is provided on the side surface of the housing 14 which is the outside of the installation region of the document setting unit 16, but instead of this configuration, a binding member detector 52 may be provided on a lower side of a tip of the document receiving unit 22 as illustrated in FIG. 8. The binding member detector 52 includes the same configuration as the binding member detector 24. Alternately, the binding member detector 24 may be provided above the discharge unit 20 on a front surface side of the housing 14. That is, if the housing 14 is the outside of the installation region of the document setting unit 16, it is possible to provide the binding member detector 24 in a position at which there is no influence on document feeding operation, discharge operation, and user operation in the housing 14.

(5) In the present embodiment, the first portion 24*a* are the second portion 24*b* in the binding member detector 24 protrude from a side surface of the housing 14. Instead of this configuration, as illustrated in FIG. 15, a scanner 82 is configured to include a first portion 84*a* and a second portion 84*b* in a binding member detector 84 disposed inside the main body portion 12 and a groove 96, disposed on the side surface of the housing 14 between the first portion 84*a* and the second portion 84*b* which face to each other and extended from the front surface side of the apparatus to the rear surface side of the apparatus, of passing the document. According to this configuration, a side surface of the apparatus cannot be a protruding shape and it is possible to provide an aesthetically excellent configuration. The configuration (principle) of the binding member detector 84 itself is the same as the configuration of the binding member detector 24 described above.

In (6) or a scanner 85 illustrated in FIG. 17, a binding member detector 86 may be provided in the edge guide 16*a*. In FIG. 17, a reference symbol 86*a* is the same oscillation coil as the oscillation coil 46*a* described above and a reference symbol 86*b* is the same detecting coil as the detecting coil 48*a* described above.

Further, in a scanner 88 illustrated in FIG. 18, a binding member detector 89 may be provided in the document setting unit 16.

(7) In the present embodiment, the binding member detector 24 is formed integrally on the side surface of the housing 14, but instead of this configuration, the binding member detector 24 may be configured to be attachable to the scanner 10.

(8) In the present embodiment, the distance L1 of the cavity 42 between the first portion 24*a* and the second portion 24*b* corresponds to the maximum loading height of the document settable to the document setting unit 16, but the embodiment is not limited thereto. The distance L1 may be shorter than the maximum loading height or longer than the maximum loading height. This also applies to the second embodiment to be described below.

(9) In the present embodiment, in a case where a target to be detected by the binding member detector 24 is limited to the binding member 44 (magnetic substance such as iron), the magnetic field generated in the binding member detector 24 may be a direct current (DC) magnetic field or an alternating current (AC). However, in a case where the binding member detector 24 also detects a conductor such as aluminum other than the binding member 44 (magnetic substance such as iron), in the DC magnetic field, there is almost no change when the conductor such as aluminum and it is difficult to detect the conductor. Then, it is necessary to generate the AC magnetic field in which changes in detection of the conductor and detection of the binding member 44 (magnetic substance such as iron) are different.

Second Embodiment

In FIG. 9, the second embodiment will be described. In FIG. 9, an image reading system 54 includes a scanner 56 and a binding member detecting apparatus 58 which is a separate apparatus from the scanner 56. In the present embodiment, the scanner 56 has the same configuration as the scanner 10 except that the binding member detector 24 is provided on a side surface of the housing 14. In the present embodiment, the scanner 56 and the binding member detecting apparatus 58 are connected with each other via a cable 59. In the present embodiment, the cable 59 includes both a signal line and a power line as an example, but the signal line and the power line may be configured as separate cables.

In FIG. 10, the binding member detecting apparatus 58 includes a first portion 58*a* and a second portion 58*b* disposed to face the first portion 58*a*. The first portion 58*a* and the second portion 58*b* are connected with a connecting portion 58*e*. A cavity 60 for passing the document bundle P1 is provided between the first portion 58*a* and the second portion 58*b* facing to each other. A distance L3 of the cavity 60 between the first portion 58*a* and the second portion 58*b* corresponds to the maximum loading height of the document settable in the document setting unit 16. The frame member 25 (not illustrated) is provided inside the first portion 58*a*, the second portion 58*b*, and the connecting portion 58*e* of the binding member detecting apparatus 58.

As illustrated in FIG. 10, a guide surface 58*d* which guides a document bundle toward the cavity 60 is formed at each of both ends of an upper surface 58*c* of the second portion 58*b* in front/rear directions of the apparatus. In the present embodiment, the magnetic field generator 46 (not illustrated) is provided in the first portion 58*a* as an example. The magnetic field detector 48 is provided in the second portion 58*b*.

In the present embodiment, for example, a transceiver 62 (two-dot chain line denoted by reference symbol 58 in FIG. 10) is provided inside the second portion 58*b*. The transceiver 62 is configured to include a plurality of electronic components as electric circuits. The transceiver 62 is configured to transmit the detecting signal of the binding member 44 by the binding member detecting apparatus 58 to the controller 40 (see FIG. 2) of the scanner 56.

A notification unit 64 is provided in the first portion 58*a*. In the present embodiment, for example, the notification unit 64 includes a plurality of indicator lamps 64A, 64B, and 64C. In the present embodiment, the indicator lamp 64A functions as a lamp indicating whether the binding member detecting apparatus 58 is on or off.

In the present embodiment, the binding member detecting apparatus 58 is provided with the document detector 50 (not illustrated) on each of the upstream side and the downstream side of the magnetic field generator 46 and the magnetic field detector 48 along the document moving direction. Here, when the document bundle P1 passes through the cavity 60, in a case where the document detector 50 on the upstream side and the document detector 50 on the downstream side detect the document and the magnetic field detector 48 does not detect the binding member 44, for example, the indicator lamp 64B is lit in blue or green. Therefore, the user can visually check that the binding member 44 is not detected.

On the other hand, when the document bundle P1 passes through the cavity 60, in a case where the document detector 50 on the upstream side and the document detector 50 on the downstream side detect the document and the magnetic field detector 48 detects the binding member 44, the indicator lamp 64C is lit in red or yellow as warning color. Therefore, the user can visually check that the binding member 44 is detected.

Also in the present embodiment, the controller is set to receive the detecting signal from the document detector 50 in a case where the user inputs the instruction to operate the document feeding operation to the user interface unit 18. Then, the controller 40 is set to start the document feeding operation in a case where the binding member detecting apparatus 58 does not detect the binding member 44.

More specifically, when receiving both of the detecting signals from the document detector 50 on the upstream side and the document detector 50 on the downstream side, the controller 40 determines that the document bundle P1 is normally passed through the binding member detecting apparatus 58 and writes information on a time of the detecting operation by the binding member detecting apparatus 58 and a detecting result (whether or not document is normally passed through binding member detecting apparatus 58 and binding member is detected) in the storage unit (not illustrated).

After then, for example, it is determined whether or not the binding member detecting apparatus 58 performs the detecting operation within a predetermined time period (for example, within one minute) from a case where the instruction to start the feeding operation is input. The controller 40 reads the information on the time of the detecting operation and the detecting result (whether or not document is normally passed through binding member detecting apparatus 58 and binding member is detected) stored in the storage unit (not illustrated).

When the binding member detecting apparatus 58 does not perform the detecting operation within the predetermined time period after the instruction to start the feeding operation is input, the feeding operation is not started and the controller 40 displays the warning message (for example, "Perform operation of detecting binding member, please") or the like to the user interface unit 18.

Accordingly, since the binding member detecting apparatus 58 obligatorily performs the operation of detecting the binding member 44 before the document P is fed from the document setting unit 16, it is possible to prevent the document bundle P1 bound by the binding member 44 as it is being fed from the document setting unit 16 and to reliably suppress damage to the document.

At this time, in a case where the detection result indicates that the binding member 44 is detected again, the feeding operation is not started and the controller 40 displays the warning message (for example, "Binding member is detected. Check, please") or the like to the user interface unit 18.

For example, even if the detecting operation is started, in a case where both of the document detector 50 on the upstream side and the document detector 50 on the downstream side do not detect the document bundle P1, or a case where one of the document detector 50 on the upstream side and the document detector 50 on the downstream side does not detect the document bundle P1, it is considered the detecting operation is not normally ended, the feeding operation is not started, and the controller 40 displays the warning message (for example, "Perform operation of detecting binding member again, please") or the like to the user interface unit 18.

Modification Example of Second Embodiment (1) In the present embodiment, the binding member detecting apparatus 58 is connected to the scanner 56 via the cable 59, but instead of this configuration, a battery unit may be provided inside the binding member detecting apparatus 58 a power may be obtained by the battery unit or the power may be obtained by contactless power supply from the scanner 56 via the transceiver 62. In a case of performing the contactless power supply, one of a radio wave receiving method, an electromagnetic induction method, and a resonance method may be used.

(2) In the present embodiment, the distance L3 between the first portion 58*a* and the second portion 58*b* is fixed, but the distance L3 may be changeable. Specifically, a position adjusting unit may be provided in the first portion 58*a* or the second portion 58*b* and one of the first portion 58*a* and the second portion 58*b* may be displaceable in a direction to approach to or separate from the other of the first portion 58*a* and the second portion 58*b*. As an example, by the first portion 58*a* approaching the second portion 58*b*, it is possible to adjust the interval between the first portion 58*a* and the second portion 58*b*. The position adjusting unit is configured of, for example, a guide mechanism, a link mechanism, or the like.

(3) In the present embodiment, as illustrated in FIGS. 9 and 10, the second portion 58*b* forms a bottom portion of the binding member detecting apparatus 58 and the binding member is detected by passing the document bundle through between the first portion 58*a* and the second portion 58*b* in a posture approximately parallel to a horizontal direction, the embodiment is not limited thereto. The first portion 58*a* and the second portion 58*b* may be set to stand in an apparatus height direction and the binding member may be detected by passing the document bundle through between the first portion 58*a* and the second portion 58*b* in a posture approximately perpendicular to the horizontal direction.

(4) In FIG. 11, a box-shaped binding member detecting apparatus 66 opening to an upper side in the apparatus height direction is illustrated as an example of the binding member detecting apparatus. The binding member detecting apparatus 66 includes a first portion 66*a*, a second portion 66*b* disposed to have an interval from the first portion 66*a* in the horizontal direction, and a contact portion 66*c* disposed on a lower side between the first portion 66*a* and the second portion 66*b*. The cavity 68 is formed between the first portion 66a and the second portion 66b. The contact portion 66c is disposed at a lower end of the cavity 68. A magnetic field generator 70 is provided to be extended along a width direction (X axis direction in FIG. 10) of the document inserted to the cavity 68 in the first portion 66a and a magnetic field detector 72 is provided to be extended along the width direction of the document in the second portion 66b.

Further, a notification unit 74 is provided on an upper surface of the binding member detecting apparatus 66. In the present embodiment, for example, the notification unit 74 includes a plurality of indicator lamps 74A, 74B, and 74C. The indicator lamps 74A, 74B, and 74C have the same configuration as the configuration of the indicator lamps 64A, 64B, and 64C, so that the description will be omitted.

In the binding member detecting apparatus 66, since the document bundle P4 is inserted from an upper side in the apparatus height direction to the cavity 68 and an end portion of the document bundle P4 comes into contact with the contact portion 66c by several times, it is possible to align the document bundle P4. In addition, while preparing the document bundle P4, the binding member detecting apparatus 66 can detect whether or not the binding member 44 exists at the lower end portion of the document bundle P4. As a result, since it is possible to simultaneously perform the operation of preparing the document and the operation of detecting the binding member 44, it is possible to improve workability.

The binding member detecting apparatus 66 may be automatically moved up and down to scan an entire region in the height direction of the document bundle P4 by using a power of a motor or the like.

In the present modification example, the magnetic field generator 70 and the magnetic field detector 72 are extended over the entire region in the width direction, but instead of this configuration, for example, the magnetic field generator 70 and the magnetic field detector 72 may be configured to have a short length in the width direction of the document and may be movable along the document width direction by a moving unit. Further, the magnetic field generator 70 and the magnetic field detector 72 are moved in the width direction of the document to scan the document bundle, so that it is possible to detect the binding member 44 in the lower end portion of the document bundle P4.

Modification Example of First Embodiment and Second Embodiment

In the binding member detector 24 and the binding member detecting apparatus 58, lengths of the second portions 24b and 58b in a passing direction of the document are longer than lengths of the first portions 24a and 58a, but the embodiment is not limited thereto. The lengths of the second portions 24b and 58b in a passing direction of the document may be set to be equal to the lengths of the first portions 24a and 58a.

Third Embodiment

Next, the third embodiment will be described with reference to FIGS. 12 to 14 and FIG. 19. A scanner 76 according to the third embodiment includes a binding member detector 78. The binding member detector 78 includes a first portion 78a and a second portion 78b. In the present embodiment, the document setting unit 16 is configured to function as the first portion 78a as an example. Specifically, the first portion 78a is provided inside the document setting unit 16. A magnetic field generator (not illustrated) is provided in the first portion 78a.

The second portion 78b is disposed on a front surface side of the main body portion 12 and to face the document setting unit 16. More specifically, as illustrated in FIG. 13, in a state in which a document P5 is set to the document setting unit 16, the second portion 78b is disposed to face an end tip in a feeding direction of the document P5. In the present embodiment, the second portion 78b is configured to have a predetermined interval from the document setting unit 16 in an opened state and to be changeable along the document feeding direction.

Specifically, a pair of arm portions 80 (see FIG. 14) are provided with an interval in the X axis direction in a lower part of the second portion 78b. The arm portion 80 is configured to be able to be switched a state (FIGS. 12 and 13) in which the arm portion 80 is stored in the main body portion 12 and a state (FIG. 14) in which the arm portion 80 is pulled out from the main body portion 12 by a driving source (not illustrated). By displacing the arm portion 80 in or outside the main body portion 12, the second portion 78b is displaced from the downstream side to the upstream side in the document feeding direction at a position facing the document P5 set to the document setting unit 16 and detects whether the binding member 44 is attached to the document P5.

In the present embodiment, when the document is set to the document setting unit 16, the document setting detection sensor 27 (FIGS. 2 and 3) detects the document. By the detecting signal, the controller 40 switches from the state in which the arm portion 80 is stored to the state in which the arm portion 80 is pulled out and causes the second portion 78b to scan the document set to the document setting unit 16. In the present embodiment, since the second portion 78b is moved in the document feeding direction and detects the binding member 44 only by setting the document to the document setting unit 16, it is possible to improve workability of the scanner 76.

The flowchart in FIG. 19 illustrates the flow of the control described above. The controller 40 determines whether or not the document exists on the document setting unit 16 based on the detecting signal from the document setting detection sensor 27 (step S201). When the document is detected (Yes in step S201), the operation of checking whether the binding member exists, that is, the operation of displacing the second portion 78b (step S202). As a result, in a case where the binding member is detected (Yes in step S203), the controller 40 displays the alert message to the user interface unit 18 and performs the error end.

On the other hand, when the binding member 44 is not detected (No in S203), the controller 40 waits until an instruction to start the reading job (step S204). When receiving the instruction to start the reading job (Yes in step S204), the controller 40 starts the reading job, that is, the feeding operation (step S205).

Modification Example of Third Embodiment

In the present embodiment, by the arm portion 80, the second portion 78b is automatically displaced in the document feeding direction, but the arm portion 80 is manually pulled out or is stored, so that the second portion 78b may be displaced. Without the arm portion 80, the user holds the second portion 78b over the document P5, then the operation of detecting the binding member 44 may be performed.

To summarize the description, the scanner 10 includes the image reading unit 34 which reads the document P, the document setting unit 16 to which the document P to be fed toward the image reading unit 34 is set, and the binding member detectors 24, 52, 78, and 84 which detect the binding member 44 binding the document P and provided outside the installation region of the document setting unit 16. According to this configuration, by detecting the binding member 44 before the feeding operation of the document P from the document setting unit 16 is started, it is possible to more reliably prevent the document P from being damaged.

The binding member detectors 24 and 84 are provided on the side surface of the housing 14 constituting an outside surface of the scanner 10.

There is provided the document receiving unit 22 which receives the document P discharged after the document P is read. The binding member detector 52 is provided on a lower side of the document receiving unit 22.

The binding member detectors 24, 52, 78, and 84 includes the first portions 24a, 78a, and 84a and the second portions 24b, 78b, and 84b disposed to face the first portions 24a, 78a, and 84a. By passing the document through between the first portions 24a, 78a, and 84a and the second portions 24b, 78b, and 84b (cavity 42 and groove 96), the binding member detectors 24, 52, 78, and 84 detect the binding member 44. According to this configuration, it is possible to prevent the document from largely deviating from a detectable region of the binding member 44 and to more reliably detect the binding member 44.

The intervals between the first portions 24a, 78a, and 84a and the second portions 24b, 78b, and 84b correspond to the maximum loading height of the document settable in the document setting unit 16. According to this configuration, since the intervals between the first portions 24a, 78a, and 84a and the second portions 24b, 78b, and 84b correspond to the maximum loading height of the document settable in the document setting unit 16, it is possible to perform both of the detecting operation of the binding member 44 by using the binding member detectors 24, 52, 78, and 84 and the operation of determining whether or not the document can be loaded in the document setting unit 16 and to improve availability of the user.

The interval (cavity 42) between the first portion 24a and the second portion 24b is configured to be adjustable. According to this configuration, by adjusting the interval (cavity 42), it is possible to adjust an output (for example, magnetic field B formed by oscillation coil 46a) so as to detect the binding member 44. As a result, for example, by decrease the interval (cavity 42), it is possible to weaken the magnetic field and to suppress that the magnetic field has a bad influence on the scanner 10 or the peripheral of the scanner 10.

The scanner 76 includes the image reading unit 34 which reads the document P, the document setting unit 16 to which the document P to be fed toward the image reading unit 34 is set, and the binding member detector 78 which detects the binding member 44 binding the document P. The binding member detector 78 is provided to be movable along the document feeding direction from and to the document setting unit 16. According to this configuration, by moving the binding member detector 78 along the document feeding direction, it is possible to detect the binding member 44 before the feeding operation of the document P is started and to more reliably prevent the document P from being damaged.

There is provided the user interface unit 18 as the notification unit which performs notification of the detection of the binding member 44 by the binding member detectors 24, 52, and 78. According to this configuration, it is possible to promptly and reliably notify the user of the presence of the binding member 44 and to improve the availability of the user.

The scanner 10 includes the feeding roller 28 which transports the document from the document setting unit 16 and the document detector 50 on the upstream side and the document detector 50 on the downstream side which detect the passage of the document P when the document passes through the binding member detectors 24 and 52. The controller 40 which controls the feeding roller 28 causes the feeding roller 28 to perform the feeding operation of the document P after both of the document detector 50 on the upstream side and the document detector 50 on the downstream side detect the passage of the document P. According to this configuration, the detecting operation using the binding member detectors 24 and 52 is obligatorily performed before the document is fed by the feeding roller 28 and it is possible to more reliably prevent the document P being damaged.

The binding member detectors 24 and 52 detect the change in the magnetic field B to detect the binding member 44. There are provided the document detector 50 which detects that the document P passes through the binding member detectors 24 and 52 and the controller 40 which receives information on the document P detected by the document detector 50 and information on the change in the magnetic field B detected by the binding member detectors 24 and 52. In a case where the binding member detectors 24 and 52 detect the change in the magnetic field B in a document undetected state in which the document detector 50 does not detect the passage of the document P, the controller 40 executes the predetermined process.

According to this configuration, in a case where the binding member detectors 24 and 52 detect the change in the magnetic field B in the document undetected state in which the document detector 50 does not detect the passage of the document P (case where both of document detector 50 on the upstream side and the document detector 50 on the downstream side do not detect the document bundle P1, or case where one of the document detector 50 on the upstream side and the document detector 50 on the downstream side does not detect the document bundle P1), that is, a case where a disturbance noise is detected, since the controller 40 executes the predetermined process, for example, displays the warning message or the like to the user interface unit 18 as the notification unit, it is possible to more accurately detect the binding member 44.

The binding member detectors 24 and 52 are provided to be detachable for the main body portion 12 of the scanner 10. According to this configuration, by removing out the binding member detectors 24 and 52 from the main body portion 12, depending on a form of the document P, the operation of detecting the binding member 44 by the binding member detectors 24 and 52 becomes easier.

The binding member detecting apparatuses 58 and 66 are the binding member detecting apparatuses which detect the binding member 44 biding the document P and include the first portions 58a and 66a and the second portions 58b and 66b disposed to face to the first portions 58a and 66a. By passing the document P through between the first portions 58a and 66a and the second portions 58b and 66b, the binding member 44 is detected. According to this configuration, it is possible to prevent the document from largely deviating from a detectable region of the binding member 44 and to more reliably detect the binding member 44.

The first portion 66*a* and the second portion 66*b* include the interval in the horizontal direction and the contact portion 66*c* which comes into contact with the end of the document P is provided on a lower side between the first portion 66*a* and the second portion 66*b*. According to this configuration, it is possible to simultaneously align the end of the document P and detect the binding member 44 and it is possible to improve the availability of the user.

The image reading system 54 includes the scanner 56 which includes the image reading unit 34 which reads the document P and the document setting unit 16 to which the document P to be fed toward the image reading unit 34 is set and the binding member detecting apparatus 58.

The binding member detecting apparatus 58 obtains a power from the scanner 56. According to this configuration, since it is unnecessary to prepare a power supply dedicated to the binding member detecting apparatus 58, it is possible to improve the availability of the user.

The distance L3 of the interval between the first portion 58*a* and the second portion 58*b* corresponds to the maximum loading height of the document settable in the document setting unit 16. According to this configuration, since it is possible to perform both of the detecting operation of the binding member 44 by using the binding member detecting apparatus 58 and the operation of determining whether or not the document P can be loaded in the document setting unit 16, it is possible to improve the availability of the user.

The invention is not limited the embodiments described above. Various modifications are possible within the scope of the invention and the various modifications are also included in the scope of the invention.

The entire disclosure of Japanese Patent Application No. 2017-127568, filed Jun. 29, 2017 and No. 2018-029881, filed Feb. 22, 2018 are expressly incorporated by reference herein.

What is claimed is:

1. An image reading apparatus comprising:
   a reading unit that reads a document;
   a document setting unit that sets the document to be fed toward the reading unit; and
   a binding member detector that detects a binding member binding the document and is provided in an outside of the document setting unit,
   wherein the binding member detector includes
   a first portion and a second portion disposed to face the first portion, and
   detects the binding member by passing the document through between the first portion and the second portion.

2. The image reading apparatus according to claim 1,
   wherein the binding member detector is provided on a side surface of a housing constituting an outside of the image reading apparatus.

3. The image reading apparatus according to claim 1, further comprising:
   a document receiving unit that receives the document read and discharged, and
   wherein the binding member detector is provided on a lower side of the document receiving unit.

4. The image reading apparatus according to claim 1,
   wherein an interval between the first portion and the second portion corresponds to a maximum loading height of the document settable to the document setting unit.

5. The image reading apparatus according to claim 1,
   wherein an interval between the first portion and the second portion is configured to be adjustable.

6. The image reading apparatus according to claim 1, further comprising:
   a notification unit that performs notification of detection of the binding member by the binding member detector.

7. The image reading apparatus according to claim 1, further comprising:
   a feeding unit that transports the document from the document setting unit; and
   a document detector that detects passage of the document when the document passes through the binding member detector,
   wherein a controller that controls the feeding unit causes the feeding unit to perform a document feeding operation after the document detector detects the passage of the document.

8. The image reading apparatus according to claim 1,
   wherein the binding member detects detecting a change in a magnetic field to detect the binding member,
   the apparatus further comprises:
   a document detector that detects passage of the document through the binding member detector; and
   a controller that receives information on the document detected by the document detector and information on the change in the magnetic field detected by the binding member detector, and
   wherein in a case where the binding member detector detects the change in the magnetic field in a document undetected state in which the document detector does not detect the passage of the document, the controller executes a predetermined process.

9. The image reading apparatus according to claim 1,
   wherein the binding member detector is detachably provided with respect to a main body of the image reading apparatus.

10. A binding member detecting apparatus that detects a binding member binding a document, the apparatus comprising:
    a first portion and a second portion disposed to face the first portion, and
    wherein the binding member is detected by passing the document through between the first portion and the second portion,
    wherein the first portion and the second portion are provided with an interval in a horizontal direction and a contact portion that comes into contact with an end of the document is provided on a lower side between the first portion and the second portion.

11. An image reading system comprising:
    an image reading apparatus that includes a reading unit which reads a document and document setting unit which sets the document to be fed toward the reading unit; and
    the binding member detecting apparatus according to claim 10.

12. The image reading system according to claim 11,
    wherein the binding member detecting apparatus obtains a power from the image reading apparatus.

13. The image reading system according to claim 12,
    wherein an interval between the first portion and the second portion corresponds to a maximum loading height of the document settable to the document setting unit.

14. A binding member detecting apparatus that detects a binding member binding a document, the apparatus comprising:

a first plate-like portion and a second plate-like portion disposed to face the first plate-like portion, and wherein the binding member is detected by passing the document through between the first plate-like portion and the second plate-like portion, wherein an interval between the first plate-like portion and the second plate-like portion is configured to be adjustable.

15. The binding member detecting apparatus according to claim 14, further comprising:

a document detector which detects that the document passes through the binding member detector.

* * * * *